United States Patent
Tsuboi et al.

(10) Patent No.: US 8,093,780 B2
(45) Date of Patent: Jan. 10, 2012

(54) MICRO-OSCILLATION ELEMENT WITH ADJUSTABLE RESONANCE FREQUENCY OF OSCILLATING PORTION

(75) Inventors: Osamu Tsuboi, Kawasaki (JP); Norinao Kouma, Kawasaki (JP); Hiromitsu Soneda, Kawasaki (JP); Hisao Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 11/889,754

(22) Filed: Aug. 16, 2007

(65) Prior Publication Data

US 2008/0054758 A1    Mar. 6, 2008

(30) Foreign Application Priority Data

Aug. 29, 2006    (JP) ................................ 2006-231662

(51) Int. Cl.
  *H02N 2/00* (2006.01)
  *G02B 26/08* (2006.01)
(52) U.S. Cl. ...................... 310/309; 359/224.1; 359/291
(58) Field of Classification Search .................... 310/309
  See application file for complete search history.

(56) References Cited

U.S. PATENT DOCUMENTS

| | | | | |
|---|---|---|---|---|
| 5,969,465 A * | 10/1999 | Neukermans et al. | ........ | 310/333 |
| 6,220,561 B1 * | 4/2001 | Garcia | .......................... | 248/487 |
| 6,654,158 B2 * | 11/2003 | Helsel et al. | .................. | 359/292 |
| 6,769,616 B2 | 8/2004 | Fu et al. | .......................... | 235/454 |
| 7,031,041 B2 * | 4/2006 | Mi et al. | ...................... | 359/224.1 |
| 7,068,296 B2 | 6/2006 | Hayashi et al. | | |
| 2005/0035682 A1 * | 2/2005 | Tsuboi et al. | .................. | 310/309 |
| 2005/0270624 A1 * | 12/2005 | Orcutt et al. | .................. | 359/291 |
| 2006/0132883 A1 * | 6/2006 | Saitoh | ........................... | 359/224 |
| 2006/0181756 A1 * | 8/2006 | Yamazaki | ...................... | 359/212 |
| 2008/0054758 A1 * | 3/2008 | Tsuboi et al. | .................. | 310/309 |

FOREIGN PATENT DOCUMENTS

| | | |
|---|---|---|
| CN | 1739053 | 2/2006 |
| JP | 8-75475 | 3/1996 |
| JP | 10-190007 | 7/1998 |
| JP | 10-270714 | 10/1998 |
| JP | 2000-31502 | 1/2000 |
| JP | 2003-84226 | 3/2003 |
| JP | 2004-219889 | * 8/2004 |

OTHER PUBLICATIONS

Chinese Office Action dated Oct. 24, 2008.

* cited by examiner

*Primary Examiner* — Karl Tamai
(74) *Attorney, Agent, or Firm* — Fujitsu Patent Center

(57) ABSTRACT

A micro-oscillation element facilitates adjusting the natural frequency relevant to the oscillating motion of the oscillating portion. The micro-oscillation element includes, for example, an oscillating portion, a frame, and a link portion that connects the oscillating portion and the frame. The link portion defines the oscillation axial center of oscillating motion of the oscillating portion with respect to the frame. The oscillating portion includes a main oscillating body, and a weight portion attached to the main oscillating body. The weight portion is movable in a direction intersecting the oscillation axial center.

5 Claims, 19 Drawing Sheets

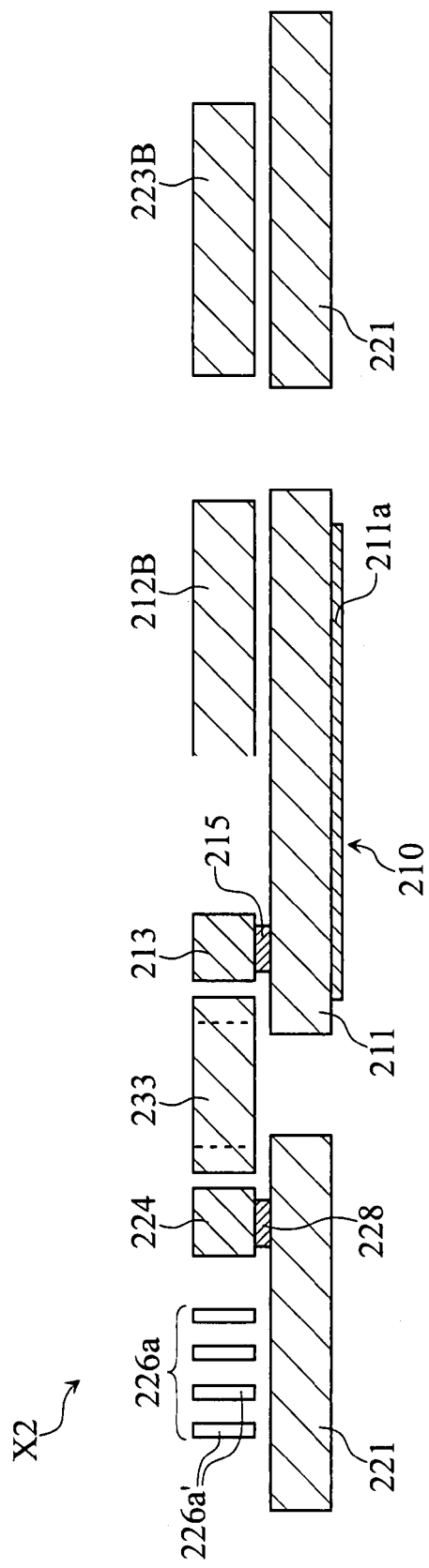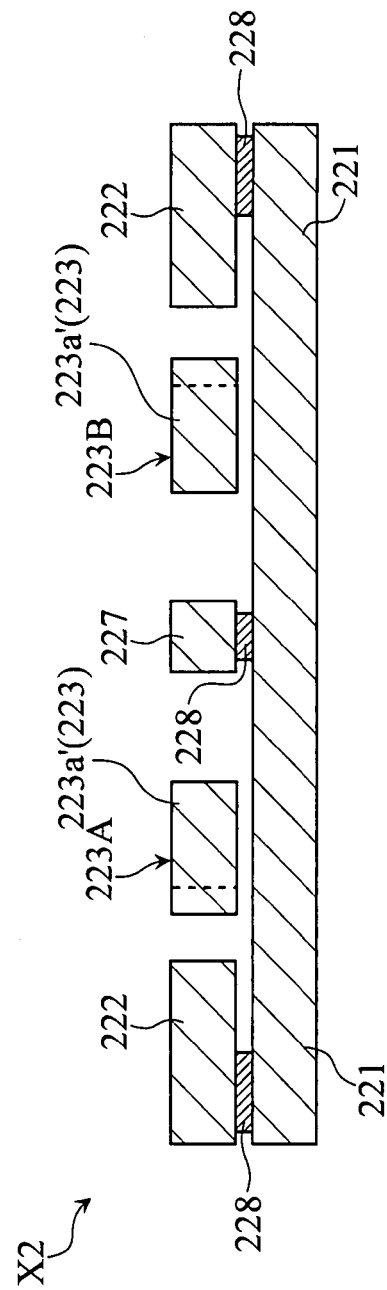

MICRO-OSCILLATION ELEMENT WITH ADJUSTABLE RESONANCE FREQUENCY OF OSCILLATING PORTION

BACKGROUND OF THE INVENTION

1. Field of the Invention

The present invention relates to a micro-oscillation element having a minute oscillating portion, such as a micromirror element, an acceleration sensor, and an angular speed sensor.

2. Description of the Related Art

Lately in various technical fields, application of elements with a minute structure formed through a micromachining technique has come to be focused on. Such elements include a micro-oscillation element that has a minute movable portion or oscillating portion, such as a micromirror element, an acceleration sensor, and an angular speed sensor. The micromirror element is employed for reflecting light, in a technical field related to an optical disk or optical communication, for example. The acceleration sensor and the angular speed sensor are employed, for example, for controlling posture of a robot or stabilizing an image in a digital camera against the user's hand motion.

The micromirror element includes a mirror surface that reflects light, so that oscillating the mirror surface can change the reflection direction of the light. Most apparatuses employ a static drive type micromirror element, which utilizes a static power for oscillating the mirror surface. The static drive type micromirror element may be broadly classified into one processed by a so-called surface micromachining technique and another processed by what is known as a bulk micromachining technique.

The surface micromachining technique includes processing material thin films corresponding to each region constituting a chip in a desired pattern on a substrate, and sequentially stacking such patterns to thereby form each component constituting the chip such as a supporting body, the mirror surface and electrodes, and a sacrifice layer which is to be removed later. The bulk micromachining technique includes etching the material substrate itself, thereby forming the supporting body and the mirror base in a desired pattern, and forming thin films that serve as the mirror surface or the electrode, as the case may be. The bulk micromachining technique is described, for example, in JP-A-H10-190007, JP-A-H10-270714, and JP-A-2000-31502.

Patent document 1: JP-A-H10-190007
Patent document 2: JP-A-H10-270714
Patent document 3: JP-A-2000-31502

Technical requirements of the micromirror element include high flatness of the mirror surface engaged in reflecting light. Whereas, in the case of employing the surface micromachining technique, the mirror surface is prone to be bent because the finished mirror surface is very thin, and it is hence quite difficult to secure the required flatness over the mirror surface having an extensive area. By the bulk micromachining technique, on the other hand, a relatively thick material substrate is processed by etching to form a mirror base, upon which a mirror surface is formed. Accordingly, the mirror surface can retain sufficient rigidity despite having a wide area. Consequently, the bulk micromachining technique provides the mirror surface with sufficiently high optical flatness.

FIGS. 26 and 27 illustrate a conventional static drive type micromirror element X4 processed by the bulk micromachining technique. FIG. 26 is an exploded perspective view of the micromirror element X4, and FIG. 27 is a cross-sectional view taken along a line XXVII-XXVII of the micromirror element X4 in FIG. 26, based on the assembled state.

In the micromirror element X4, a mirror substrate 40 is stacked on a base substrate 46. The mirror substrate 40 includes a mirror base 41, a frame 42, and a pair of torsion bars 43 connecting the mirror base 41 and the frame 42. Performing an etching process on either side of a substrate of a predetermined conductive material, such as a silicon substrate, can lead to formation of the outer shape of the mirror substrate 40 including the mirror base 41, frame 42, and the pair of torsion bars 43. On the upper face of the mirror base 41, a mirror surface 44 is provided. On the back of the mirror base 41, a pair of electrodes 45a, 45b is provided. The pair of torsion bars 43 defines an axial center A4 of the rotating motion of the mirror base 41, which will be subsequently described. The base substrate 46 includes an electrode 47a facing the electrode 45a of the mirror base 41, and an electrode 47b facing the electrode 45b.

In the micromirror element X4, when a potential is applied to the frame 42 of the mirror substrate 40, the potential is transmitted to the electrode 45a and the electrode 45b via the pair of torsion bars 43 and the mirror base 41, which are integrally formed with the frame 42 from the same conductive material. Accordingly, applying a predetermined potential to the frame 42 allows charging the electrodes 45a, 45b positively, for example. When the electrode 47a of the base substrate 46 is negatively charged under such state, a static attractive force is generated between the electrode 45a and the electrode 47a, thereby causing the mirror base 41 to rotate in a direction indicated by arrows M4 as shown in FIG. 27, twisting the pair of torsion bars 43. The mirror base 41 can oscillate in an angle where the static attractive force between the electrodes and a total sum of the torsional resistance of the respective torsion bar 43 are balanced. On the other hand, negatively charging the electrode 47b while the electrodes 45a, 45b of the mirror base 41 are positively charged generates a static attractive force between the electrode 45b and the electrode 47b, thereby causing the mirror base 41 to rotate in a direction opposite to the arrows M4. Driving thus the mirror base 41 to oscillate allows switching the direction of light reflected by the mirror surface 44.

For the micro-oscillation element having an oscillating portion, the natural frequency or resonance frequency relevant to the oscillating motion of the oscillating portion is a critical characteristic that definitely determines the motion speed and oscillation amplitude (maximum oscillation angle) of the oscillating portion. In the conventional micro-oscillation element, in order to adjust the natural frequency of the oscillating portion after once completing the formation of the chip, it is necessary to perform a trimming process with a laser or focused ion beam on the oscillating portion thereby scraping the oscillating portion thus to reduce the mass, hence the inertia thereof, or to perform a trimming process on a link portion connecting the oscillating portion and the frame (immobile portion) thereby scraping the link portion thus to reduce the torsion spring constant thereof (because generally the smaller the inertia of the oscillating portion is, the higher the natural frequency thereof is, and the smaller the torsion spring constant of the link portion is, the lower the natural frequency thereof is). In order to adjust the natural frequency of the mirror base 41 (oscillating portion), for example in the micromirror element X4, it is necessary to perform the trimming process either on the mirror base 41 thereby reducing the inertia of the mirror base 41, or on the torsion bars 43 connecting the mirror base 41 and the frame 42 (immobile portion) thereby reducing the torsion spring constant of the torsion bar 43. Adjusting the natural frequency of the oscillating portion after once completing the formation of the chip is particularly necessary when collectively processing identically designed micro-oscillation elements on the wafer thus executing a mass production. This is because, in the case of the mass production, fluctuation in natural frequency among the chips is prone to be incurred from an error in processing dimensions in the oscillating portion or the link portion.

Such adjustment of the natural frequency by a posterior mechanical process (trimming process), however, incurs an increase in the number of manufacturing steps of the micro-oscillation element, as well as in manufacturing cost thereof. Besides, such posterior mechanical process only allows reducing the inertia of the oscillating portion or the torsion spring constant of the link portion for the adjustment of the natural frequency, thereby restricting of freedom in adjusting the natural frequency of the oscillating portion.

SUMMARY OF THE INVENTION

The present invention has been proposed in view of the foregoing situation, with an object to provide a micro-oscillation element that facilitates adjusting the natural frequency (resonance frequency) relevant to the oscillating motion of the oscillating portion.

A first aspect of the present invention provides a micro-oscillation element comprising an oscillating portion, a frame, and a link portion that connects the oscillating portion and the frame and defines an oscillation axial center of an oscillating motion of the oscillating portion with respect to the frame. The oscillating portion includes a main oscillating body, and a weight portion attached to the main oscillating body in a manner such that it is movable in a direction intersecting the oscillation axial center.

In the micro-oscillation element including the oscillating portion, the frame, and the link portion (torsional link portion) that connects the oscillating portion and the frame and defines an oscillation axial center of an oscillating motion of the oscillating portion with respect to the frame, the natural frequency (resonance frequency) f relevant to the oscillating motion of the oscillating portion may be expressed by the following equation (1). In the equation (1), k represents the torsion spring constant of the link portion, and I the inertia of the oscillating portion.

$$f = \frac{1}{2\pi}\sqrt{\frac{k}{I}} \quad (1)$$

In the micro-oscillation element according to the first aspect of the present invention, whereas the oscillating portion includes the weight portion that can be displaced in a direction intersecting the oscillation axial center of the oscillating portion, the displacement of the weight portion provokes a change in inertia I of the oscillating portion (the inertia I includes inertia components of each portion constituting the oscillating portion). The closer to the oscillation axial center the weight portion is, i.e. the smaller the rotation radius of the weight portion is, the smaller inertia the weight portion obtains and the smaller inertia I the oscillating portion obtains. The farther from the oscillation axial center the weight portion is, i.e. the larger the rotation radius of the weight portion is, the greater inertia the weight portion obtains and the greater inertia I the oscillating portion obtains. As is understood from the equation (1), the smaller the inertia I of the oscillating portion is, the higher the natural frequency (resonance frequency) f relevant to the oscillating motion of the oscillating portion becomes, and the greater the inertia I is, the lower the natural frequency f becomes.

The micro-oscillation element thus constructed allows, therefore, controlling the inertia I of the oscillating portion by displacing the weight portion of the oscillating portion, thereby adjusting the natural frequency f relevant to the oscillating motion of the oscillating portion. Such adjusting method of the natural frequency allows analogically adjusting the natural frequency f relevant to the oscillating motion of the oscillating portion in finer increments, and hence with higher accuracy, than the conventional natural frequency adjustment by the mechanical process.

The proposed micro-oscillation element also eliminates the need of performing the mechanical process on the oscillating portion for adjusting the natural frequency f, after once completing the formation of the chip. Moreover, the proposed micro-oscillation element permits increasing the inertia I of the oscillating portion, even after once decreasing, thereby providing a higher degree of freedom in adjusting the natural frequency f.

Thus, the micro-oscillation element according to the first aspect of the present invention significantly facilitates adjusting the natural frequency (resonance frequency) relevant to the oscillating motion of the oscillating portion.

In the first aspect of the present invention, it is preferable that the oscillating portion includes a supporting base fixed to the main oscillating body, and a supporting beam that connects the supporting base and the weight portion. Such structure is desirable in properly displacing the weight portion.

Preferably, the oscillating portion may include a first comb electrode fixed to the main oscillating body, and the weight portion may include a second comb electrode that generates a static attractive force in cooperation with the first comb electrode. Such structure is desirable in properly displacing the weight portion.

A second aspect of the present invention provides a micro-oscillation element comprising an oscillating portion, a frame, and a link portion that connects the oscillating portion and the frame, defining an oscillation axial center of an oscillating motion of the oscillating portion with respect to the frame. The link portion includes a plurality of parallelly disposed torsion bars, and two torsion bars selected from the plurality of torsion bars are disposed to move closer to or away from each other.

In the micro-oscillation element according to the second aspect of the present invention, whereas the link portion includes two torsion bars disposed to move closer to or away from each other, the movement of the two torsion bars closer to or away from each other provokes a change in torsion spring constant k of the link portion. The shorter the distance between those torsion bars is, the smaller the torsion spring constant k of the link portion including those torsion bars becomes. The longer the distance between those torsion bars is, the greater the torsion spring constant k of the link portion becomes. As is understood from the equation (1), the smaller the torsion spring constant k of the link portion is, the lower the natural frequency (resonance frequency) f relevant to the oscillating motion of the oscillating portion becomes, and the greater the torsion spring constant k is, the higher the natural frequency f becomes.

The micro-oscillation element thus constructed allows, therefore, controlling the torsion spring constant k of the link portion by moving the two torsion bars closer to or away from each other, thereby adjusting the natural frequency f relevant to the oscillating motion of the oscillating portion. Such adjusting method of the natural frequency allows analogically adjusting the natural frequency f relevant to the oscillating motion of the oscillating portion in finer increments, and hence with higher accuracy, than the conventional natural frequency adjustment by the mechanical process.

The proposed micro-oscillation element also eliminates the need of performing the mechanical process on the oscillating portion for adjusting the natural frequency f, after once completing the formation of the chip. Moreover, the proposed micro-oscillation element equally permits increasing or decreasing the torsion spring constant k of the link portion, thereby providing a higher degree of freedom in adjusting the natural frequency f.

Thus, the micro-oscillation element according to the second aspect of the present invention significantly facilitates adjusting the natural frequency (resonance frequency) relevant to the oscillating motion of the oscillating portion.

In the second aspect of the present invention, it is preferable that the oscillating portion includes a main oscillating body, and a first movable portion fixed to the main oscillating body in a manner such that it is movable in a direction intersecting the oscillation axial center, and the frame includes a main frame body and a second movable portion attached to the main frame body to be displaced in a same direction as the first movable portion, and one of the torsion bars included in the link portion connects the first and the second movable portion. Such structure is desirable in properly moving the pair of torsion bars closer to or away from each other.

Preferably, the oscillating portion may include a first comb electrode fixed to the main oscillating body, and the first movable portion may include a second comb electrode that generates a static attractive force in cooperation with the first comb electrode. Alternatively, the frame may include a first comb electrode fixed to the main frame body, and the second movable portion may include a second comb electrode that generates a static attractive force in cooperation with the first comb electrode. Such structures are desirable in properly moving the pair of torsion bars closer to or away from each other.

A third aspect of the present invention provides a micro-oscillation element comprising an oscillating portion, a frame, a link portion that connects the oscillating portion and the frame, and defines an oscillation axial center of an oscillating motion of the oscillating portion with respect to the frame, a first drive mechanism, and a second drive mechanism. The first drive mechanism is capable of generating a rotational torque for the oscillating portion in a first oscillation direction (for example, the direction that increases the oscillation angle of the oscillating portion), and controlling one or both of the magnitude and generating time of the rotational torque. The second drive mechanism is capable of generating a rotational torque for the oscillating portion in a second oscillation direction opposite to the first oscillation direction (for example, the direction that decreases the oscillation angle of the oscillating portion), and controlling one or both of the magnitude and generating time of the rotational torque. The first and the second drive mechanism may be electrically operated.

The micro-oscillation element according to the third aspect of the present invention allows electrically creating, for adjusting the natural frequency f, a state equivalent to increasing or decreasing the torsion spring constant k of the link portion. Specifically, changing the operation mode of one or both of the first and the second drive mechanism from that of the first and the second drive mechanism under a normal drive, in which the first and the second drive mechanism are driven to constantly apply an identical rotational torque to the oscillating portion in its oscillating motion, can create a state equivalent to increasing or decreasing the torsion spring constant k of the link portion in a part of the oscillation angle range of the oscillating motion of the oscillating portion, thereby creating a state equivalent to increasing or decreasing the average torsion spring constant k of the link portion during the oscillation of the oscillating portion.

In the case where the rotational torque generated by the first drive mechanism is designed to act on the oscillating portion in a direction that increases the oscillation angle of the oscillating portion, for example increasing the rotational torque generated by the first drive mechanism or extending the generating time of the rotational torque, in comparison with the operation mode of the first drive mechanism performed under the normal drive while increasing the oscillation angle of the oscillating portion, can create a state equivalent to decreasing the torsion spring constant of the link portion while increasing the oscillation angle. In contrast, decreasing the rotational torque generated by the first drive mechanism or shortening the generating time of the rotational torque, in comparison with the operation mode of the first drive mechanism performed under the normal drive while increasing the oscillation angle of the oscillating portion, can create a state equivalent to increasing the torsion spring constant of the link portion while increasing the oscillation angle.

In the case where the rotational torque generated by the second drive mechanism is designed to act on the oscillating portion in a direction that decreases the oscillation angle of the oscillating portion, for example increasing the rotational torque generated by the second drive mechanism or extending the generating time of the rotational torque, in comparison with the operation mode of the second drive mechanism performed under the normal drive while decreasing the oscillation angle of the oscillating portion, can create a state equivalent to increasing the torsion spring constant of the link portion while decreasing the oscillation angle. In contrast, decreasing the rotational torque generated by the second drive mechanism or shortening the generating time of the rotational torque, in comparison with the operation mode of the second drive mechanism performed under the normal drive while decreasing the oscillation angle of the oscillating portion, can create a state equivalent to decreasing the torsion spring constant of the link portion while decreasing the oscillation angle.

Changing, for example as above, the operation mode of one or both of the first and the second drive mechanism from that of the first and the second drive mechanism in a normal drive can create a state equivalent to increasing or decreasing the torsion spring constant of the link portion in a part of the oscillation angle range of the oscillating motion of the oscillating portion, thereby creating a state equivalent to increasing or decreasing the average torsion spring constant k of the link portion during the oscillation of the oscillating portion.

As is understood from the equation (1), the smaller the torsion spring constant k of the link portion is, the lower the natural frequency (resonance frequency) f relevant to the oscillating motion of the oscillating portion becomes, and the greater the torsion spring constant k is, the higher the natural frequency f becomes.

The micro-oscillation element according to the third aspect of the present invention allows, therefore, electrically controlling the torsion spring constant k of the link portion by changing the operation mode of one or both of the first and the second drive mechanism, thereby adjusting the natural frequency f relevant to the oscillating motion of the oscillating portion. Such adjusting method of the natural frequency allows analogically adjusting the natural frequency f relevant to the oscillating motion of the oscillating portion in finer increments, and hence with higher accuracy, than the conventional natural frequency adjustment by the mechanical process.

The proposed micro-oscillation element also eliminates the need of performing the mechanical process on the oscillating portion for adjusting the natural frequency f, after once completing the formation of the chip. Moreover, the proposed micro-oscillation element equally permits electrically increasing or decreasing the torsion spring constant k of the link portion, thereby providing a higher degree of freedom in adjusting the natural frequency f.

Thus, the micro-oscillation element according to the third aspect of the present invention significantly facilitates adjusting the natural frequency (resonance frequency) relevant to the oscillating motion of the oscillating portion.

In the third aspect of the present invention, it is preferable that the first drive mechanism and the second drive mechanism include a first comb electrode, a second comb electrode that generates a static attractive force in cooperation with the first comb electrode, and a third comb electrode that generates a static attractive force in cooperation with the first comb electrode, and the first comb electrode is fixed to the oscillating portion; the second comb electrode is fixed to the frame at a position where the second comb electrode does not face the first comb electrode when not being driven; and the third comb electrode is fixed to the frame at a position where the third comb electrode faces the first comb electrode when not being driven; and the second and the third comb electrode are parallelly disposed. Such structure is desirable in electrically controlling the torsion spring constant effectively through the first and the second drive mechanism.

A fourth aspect of the present invention provides a micro-oscillation element comprising an oscillating portion, a frame, and a link portion that connects the oscillating portion and the frame and also defines an oscillation axial center of an oscillating motion of the oscillating portion with respect to the frame. In addition, the micro-oscillation element includes the structure associated with the weight portion in the oscillation element according to the first aspect, the structure associated with the link portion in the micro-oscillation element according to the second aspect, and the structure associated with the first and the second drive mechanism in the micro-oscillation element according to the third aspect. The micro-oscillation element thus configured totally provides the technical advantages described referring to the first aspect, the second aspect, and the third aspect of the present invention.

A fifth aspect of the present invention provides a micro-oscillation element comprising an oscillating portion, a frame, and a link portion that connects the oscillating portion and the frame and also defines an oscillation axial center of an oscillating motion of the oscillating portion with respect to the frame. In addition, the micro-oscillation element includes the structure associated with the weight portion in the oscillation element according to the first aspect, and the structure associated with the link portion in the micro-oscillation element according to the second aspect. The micro-oscillation element thus configured totally provides the technical advantages described referring to the first aspect and the second aspect of the present invention.

A sixth aspect of the present invention provides a micro-oscillation element comprising an oscillating portion, a frame, and a link portion that connects the oscillating portion and the frame and also defines an oscillation axial center of an oscillating motion of the oscillating portion with respect to the frame. In addition, the micro-oscillation element includes the structure associated with the weight portion in the oscillation element according to the first aspect, and the structure associated with the first and the second drive mechanism in the micro-oscillation element according to the third aspect. The micro-oscillation element thus configured totally provides the technical advantages described referring to the first aspect and the third aspect of the present invention.

A seventh aspect of the present invention provides a micro-oscillation element comprising an oscillating portion, a frame, and a link portion that connects the oscillating portion and the frame and also defines an oscillation axial center of an oscillating motion of the oscillating portion with respect to the frame. In addition, the micro-oscillation element includes the structure associated with the link portion in the micro-oscillation element according to the second aspect, and the structure associated with the first and the second drive mechanism in the micro-oscillation element according to the third aspect. The micro-oscillation element thus configured totally provides the technical advantages described referring to the second aspect and the third aspect of the present invention.

BRIEF DESCRIPTION OF THE DRAWINGS

FIG. 13 is a cross-sectional view taken along a line XIII-XIII in FIG. 10;

FIG. 14 is a cross-sectional view taken along a line XIV-XIV in FIG. 10;

DETAILED DESCRIPTION OF THE PREFERRED EMBODIMENTS

Figure 1:
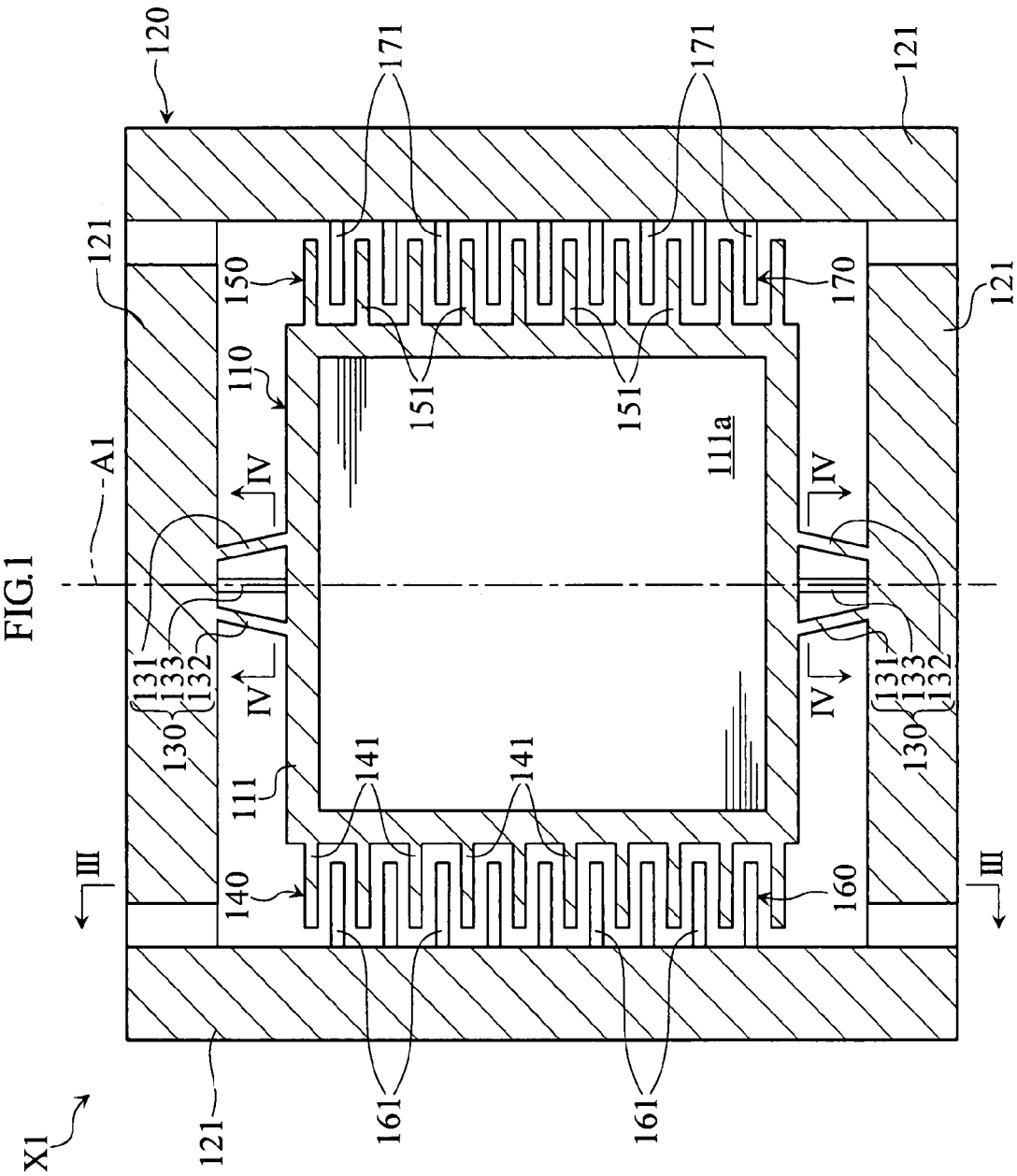
FIG. 1 is a plan view showing a micromirror element according to a first embodiment of the present invention.
Figure 2:
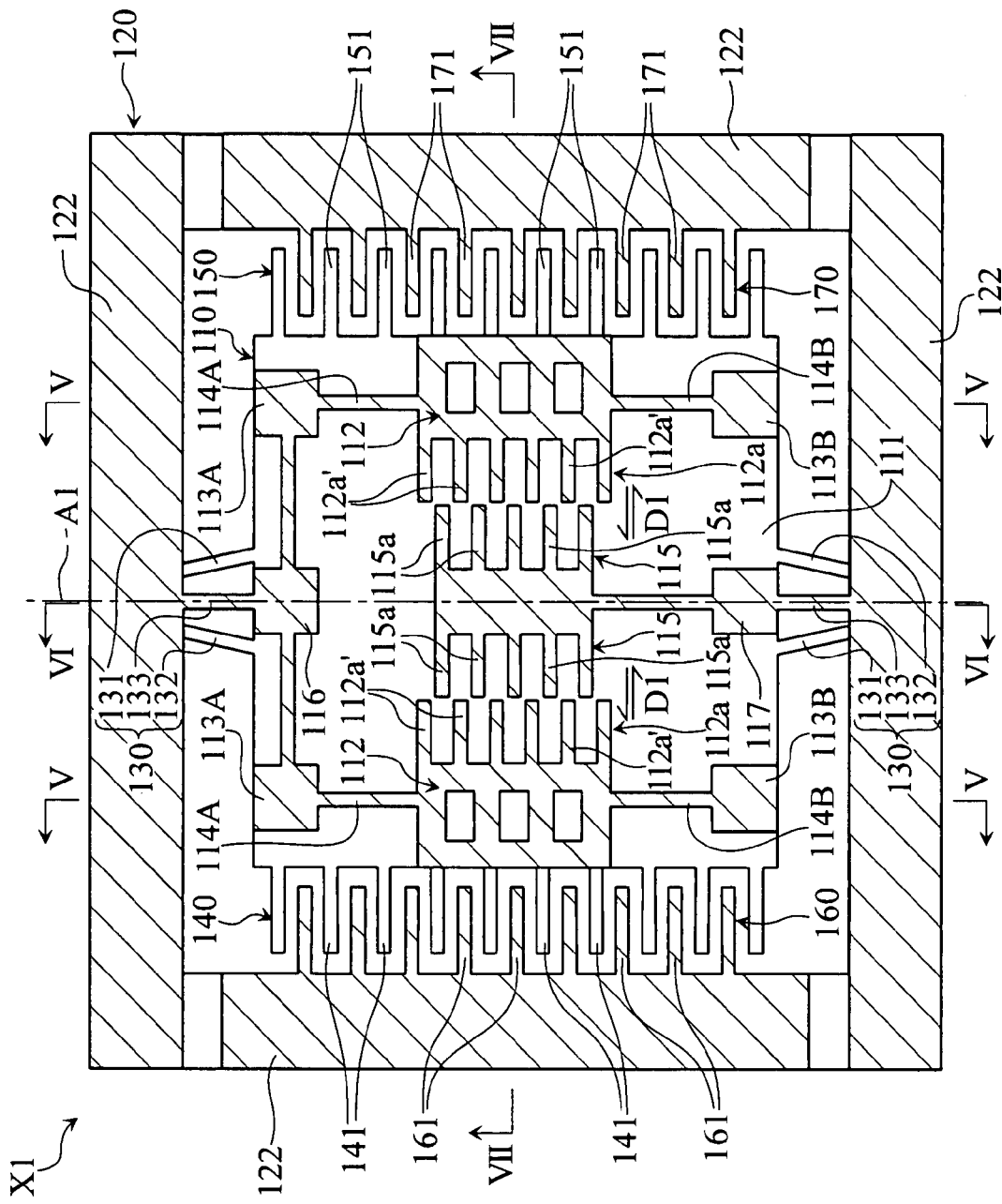
FIG. 2 is another plan view showing the micromirror element according to the first embodiment of the present invention.
Figure 3:
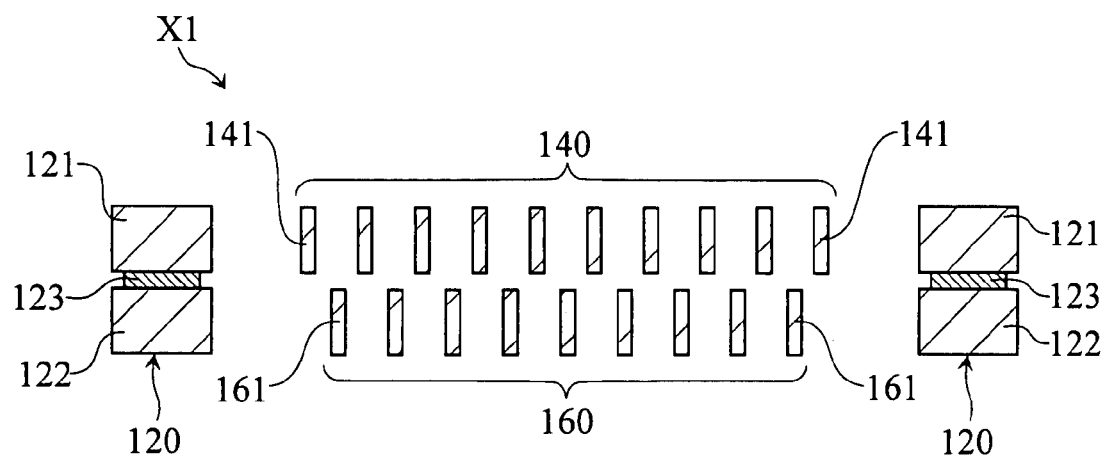
FIG. 3 is a cross-sectional view taken along a line III-III in FIG. 1.
Figure 4:
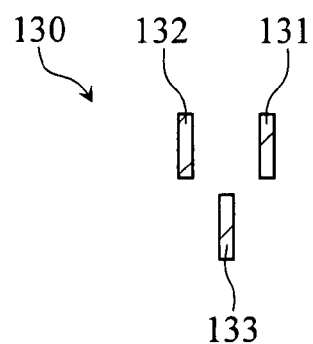
FIG. 4 is a cross-sectional view taken along a line IV-IV in FIG. 1.
Figure 5:
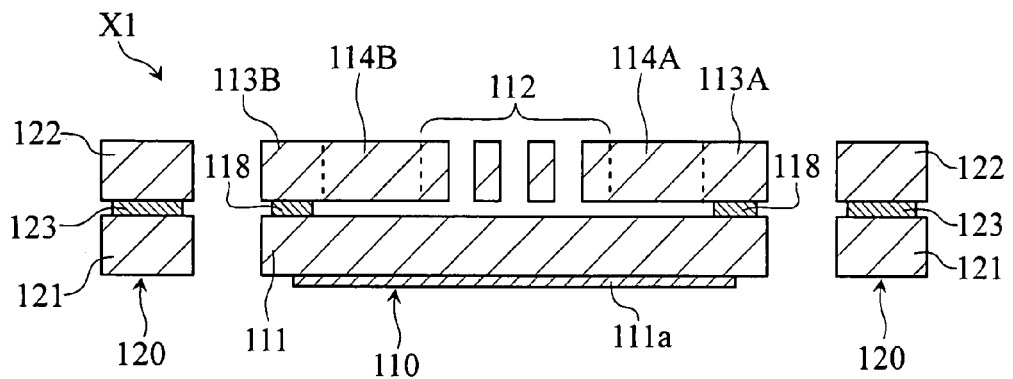
FIG. 5 is a cross-sectional view taken along a line V-V in FIG. 2.
Figure 6:
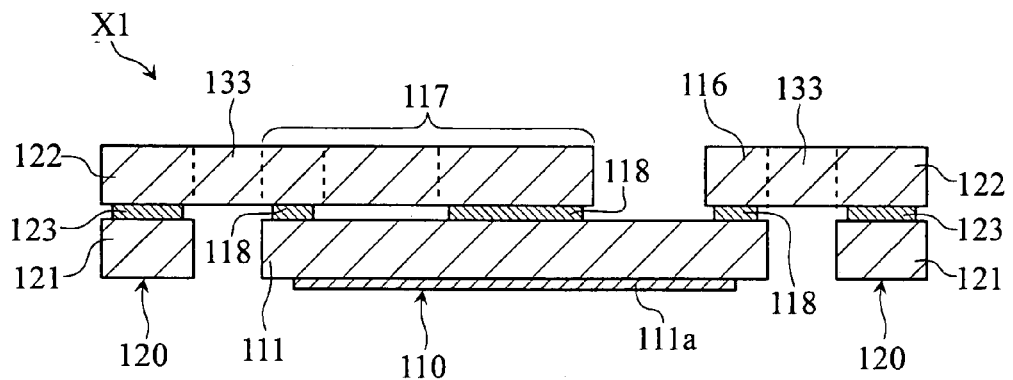
FIG. 6 is a cross-sectional view taken along a line VI-VI in FIG. 2.
Figure 7:
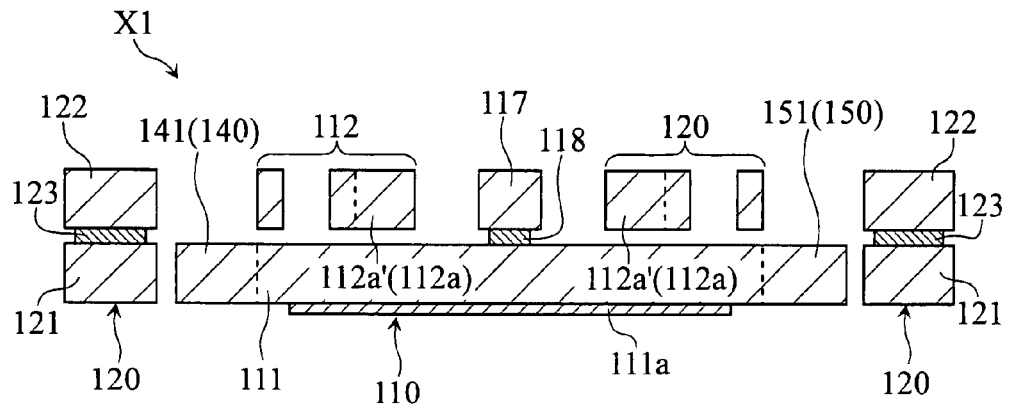
FIG. 7 is a cross-sectional view taken along a line VII-VII in FIG. 2.

FIGS. 1 to 7 illustrate a micromirror element X1 according to a first embodiment of the present invention. FIG. 1 is a plan view of the micromirror element X1, and FIG. 2 is another plan view of the micromirror element X1. FIGS. 3 and 4 are cross-sectional views taken along a line III-III and IV-IV in FIG. 1, respectively. FIGS. 5 to 7 are cross-sectional views taken along a line V-V, VI-VI, and VII-VII in FIG. 2, respectively.

The micromirror element X1 includes an oscillating portion 110, a frame 120, a pair of link portions 130, and comb electrodes 140, 150, 160, 170. The micromirror element X1 is herein assumed to be manufactured through processing a material substrate which is so called a silicon-on-insulator (SOI) substrate, by a bulk micromachining technique such as a MEMS technique. The material substrate has a multilayer structure including, for example, a first and a second silicon layer, and an insulating layer interposed between the silicon layers, which are given a predetermined conductivity by doping an impurity. FIG. 1 is a plan view primarily illustrating a structure originating from the first silicon layer, while FIG. 2 primarily depicts a structure originating from the second silicon layer. For the sake of explicitness of the drawings, hatched sections in FIG. 1 indicate the portion originating from the first silicon layer and located closer to the viewer than the insulating layer (except for a mirror surface 111a to be described later), and hatched sections in FIG. 2 indicate the portion originating from the second silicon layer and located closer to the viewer than the insulating layer.

The oscillating portion 110 includes a main oscillating body 111, a pair of weight portions 112, supporting bases 113A, 113B, supporting beams 114A, 114B, a pair of comb electrodes 115 and interconnect portions 116, 117, and is set to oscillate with respect to the frame 120.

The main oscillating body 111 is formed on the first silicon layer, and includes on its surface a mirror surface 111a capable of reflecting light, for example as shown in FIG. 1. The mirror surface 111a has a multilayer structure including a Cr layer deposited on the first silicon layer and an Au layer formed on the Cr layer.

Each weight portion 112 is, as shown in FIG. 5, attached to the main oscillating body 111 via the supporting bases 113A, 113B fixed to the main oscillating body 111 via an insulating layer 118, the supporting beam 114A connecting the supporting base 113A and the weight portion 112, and the supporting beam 114B connecting the supporting base 113B and the weight portion 112, and can be displaced as indicated by an arrow D1 in FIG. 2. Each weight portion 112 includes a comb electrode 112a including a plurality of parallelly aligned electrode teeth 112a'. The comb electrode 112a of the weight portion 112, which is a movable member, constitutes a movable electrode in a weight portion displacement mechanism. Each supporting base 113A is connected to the interconnect portion 116 as shown in FIG. 2. The interconnect portion 116 is fixed to the main oscillating body 111 via the insulating layer 118, as shown in FIG. 6. The weight portion 112, the supporting bases 113A, 113B, the supporting beams 114A, 114B, and the interconnect portion 116 are members formed on the second silicon layer.

Each comb electrode 115 serves to generate a static attractive force in cooperation with the comb electrode 112a of the weight portion 112, and includes a plurality of parallelly aligned electrode teeth 115a fixed to the interconnect portion 117 as shown in FIG. 2. The interconnect portion 117 is partly fixed to the main oscillating body 111 via the insulating layer 118, as shown in FIGS. 6 and 7. Each comb electrode 115 fixed to the interconnect portion 117, which is fixed to the main oscillating body 111, constitutes a fixed electrode in the weight portion displacement mechanism. The comb electrode 115 and the interconnect portion 117 are members formed on the second silicon layer.

The frame 120 includes a first layered structure 121 and a second layered structure 122, and is formed to surround the oscillating portion 110. The first layered structure 121 is a member formed on the first silicon layer, and the second layered structure 122 is a member formed on the second silicon layer. The first layered structure 121 and the second layered structure 122 are joined via the insulating layer 123.

The pair of link portions 130 respectively includes three torsion bars 131, 132, 133 as shown in FIGS. 1, 2, and 4, thereby connecting the oscillating portion 110 and the frame 120. The torsion bars 131, 132 are members formed on the first silicon layer, and connecting, as shown in FIG. 1, the main oscillating body 111 of the oscillating portion 110 and the first layered structure 121 of the frame 120. The space between the torsion bars 131, 132 of each link portion 130 is gradually widened in a direction from the frame 120 toward the oscillating portion 110. Each torsion bar 133 is a member formed on the second silicon layer. As shown in FIGS. 2 and 6, one of the torsion bars 133 serves to connect the interconnect portion 116 of the oscillating portion 110 and the second layered structure 122 of the frame 120, while the other torsion bar 133 serves to connect the interconnect portion 117 of the oscillating portion 110 and the second layered structure 122 of the frame 120. In each link portion 130, the torsion bars 131, 132 and the torsion bar 133 are electrically isolated. Likewise, the region of the second layered structure 122 connected to one of the torsion bars 133 and the region of the second layered structure 122 connected to the other torsion bar 133 are electrically isolated, and hence these torsion bars 133 are electrically isolated.

The pair of link portions 130 thus configured defines an oscillation axial center A1 of a rotating motion of the oscillating portion 110 about the frame 120. Each link portion 130 including the two torsion bars 131, 132 defining therebetween a space gradually increasing from the frame 120 toward the oscillating portion 110 is advantageous in suppressing emergence of an unnecessary displacement component in the rotating motion of the oscillating portion 110.

The comb electrode 140 includes a plurality of electrode teeth 141 formed on the first silicon layer, and the electrode teeth 141 respectively extend from the main oscillating body 111 of the oscillating portion 110 and are mutually parallel, for example as shown in FIG. 1.

The comb electrode 150 includes a plurality of electrode teeth 151 formed on the first silicon layer, and the electrode teeth 151 respectively extend from the main oscillating body 111 on the opposite side of the electrode teeth 141 of the comb electrode 140, and are mutually parallel, for example as shown in FIG. 1.

The comb electrode 160 serves to generate a static attractive force in cooperation with the comb electrode 140, and includes a plurality of electrode teeth 161 originating from the second silicon layer. The electrode teeth 161 respectively extend from the second layered structure 122 of the frame 120, and are parallel to one another, as well as to the electrode teeth 141 of the comb electrode 140, as shown in FIG. 2. The comb electrodes 140, 160 are disposed such that the position of each electrode tooth 141, 161 is shifted from one another, for example as shown in FIG. 3. The pair of comb electrodes 140, 160 constitutes an actuator in the micromirror element X1.

The comb electrode 170 serves to generate a static attractive force in cooperation with the comb electrode 150, and includes a plurality of electrode teeth 171 originating from the second silicon layer. The electrode teeth 171 respectively extend from the second layered structure 122 of the frame 120, and are parallel to one another, as well as to the electrode teeth 151 of the comb electrode 150, as shown in FIG. 2. The comb electrodes 150, 170 are disposed such that the position of each electrode tooth 151, 171 is shifted from one another. The pair of comb electrodes 140, 160 constitutes an actuator in the micromirror element X1. Also, the region of the second layered structure 122 connected to the comb electrode 160 and the region of the second layered structure 122 connected to the comb electrode 170 are electrically isolated, and hence these comb electrodes 160, 170 are electrically isolated.

The micromirror element X1 is, as already stated, manufactured through processing the material substrate having a multilayer structure by a bulk micromachining technique such as a MEMS technique. The material substrate in this embodiment has, as stated above, the multilayer structure including the first and the second silicon layer, and the insulating layer interposed between the silicon layers.

To manufacture the micromirror element X1, etching processes are performed at predetermined timings on the material substrate, utilizing, for example, etching masks that cover the regions corresponding to the main oscillating body 111, the first layered structure 121, as well as etching masks that cover the regions corresponding to the torsion bars 131, 132, the weight portion 112, the supporting bases 113A, 113B, the supporting beams 114A, 114B, the comb electrode 115, the interconnect portions 116, 117, the second layered structure 122, and the torsion bar 133 as the case may be, thereby processing the respective silicon layers. Suitable etching methods include a dry etching such as a deep reactive ion etching (hereinafter, Deep RIE), and a wet etching such as KOH. Unnecessary portions of the insulating layer are duly removed in each etching process. Through such steps, the respective portions of the micromirror element X1 are formed on the material substrate including the first and the second silicon layer and the insulating layer.

In the micromirror element X1, applying a predetermined potential to each of the comb electrodes 140, 150, 160, 170 as required can cause the oscillating portion 110 to oscillate or to be rotationally displaced about the oscillation axial center A1. The potential may be applied to the comb electrodes 140, 150 through the first layered structure 121 of the frame 120, the torsion bars 131, 132 of each link portion 130, and the main oscillating body 111 of the oscillating portion 110. The comb electrodes 140, 150 are, for example, grounded. The potential may be applied to the comb electrode 160 through a part of the second layered structure 122 of the frame 120, and to the comb electrode 170 through another part of the second layered structure 122. Since the comb electrode 160 and the comb electrode 170 are electrically isolated as already stated, the potential can be independently applied to each of the comb electrodes 160, 170.

Upon generating a desired static attractive force by applying the predetermined potential to each of the comb electrodes 140, 160, the comb electrode 140 is attracted into the comb electrode 160. This causes the oscillating portion 110 to oscillate about the oscillation axial center A1, thus rotationally displacing the oscillating portion 110 until the static attractive force and the sum of the torsional resistance of each link portion 130, which is now torsionally deformed, are balanced. The amount of such rotational displacement of the oscillating motion may be controlled by adjusting the potential to be applied to the comb electrodes 140, 160. Upon turning off the static attractive force between the comb electrodes 140, 160, each link portion 130 (torsion bars 131, 132, 133) releases the torsional stress thus restoring the natural state.

Likewise, upon generating a desired static attractive force by applying the predetermined potential to each of the comb electrodes 150, 170, the comb electrode 150 is attracted into the comb electrode 170. This causes the oscillating portion 110 to oscillate about the oscillation axial center A1 in the opposite direction to the case of the foregoing paragraph, thus rotationally displacing the oscillating portion 110 until the static attractive force and the sum of the torsional resistance of each link portion 130, which is now torsionally deformed, are balanced. The amount of such rotational displacement of the oscillating motion may be controlled by adjusting the potential to be applied to the comb electrodes 150, 170. Upon turning off the static attractive force between the comb electrodes 150, 170, each link portion 130 (torsion bars 131, 132, 133) releases the torsional stress thus restoring the natural state.

In the micromirror element X1, driving thus the oscillating motion of the oscillating portion 110 can switch as desired the direction of light reflected by the mirror surface 111a provided on the main oscillating body 111.

Also, in the micromirror element X1, applying a predetermined potential to the comb electrode 112a of each weight portion 112 and each comb electrode 115 of the oscillating portion 110 as required can displace each weight portion 112 in a direction intersecting the oscillation axial center A1 (in this embodiment, a direction orthogonal thereto). The potential may be applied to the comb electrode 112a through a part of the second layered structure 122 of the frame 120, the torsion bar 133 of one of the link portions 130, the interconnect portion 116 of the oscillating portion 110, the supporting base 113A, and the supporting beam 114A. The comb electrode 112a may be, for example, grounded. On the other hand, the potential may be applied to the comb electrode 115 through another part of the second layered structure 122 of the frame 120, the torsion bar 133 of the other link portion 130, and the interconnect portion 117 of the oscillating portion 110. Since the torsion bars 133 are electrically isolated as already stated, the potential can be independently applied to each of the comb electrodes 112a, 115.

Figure 8:
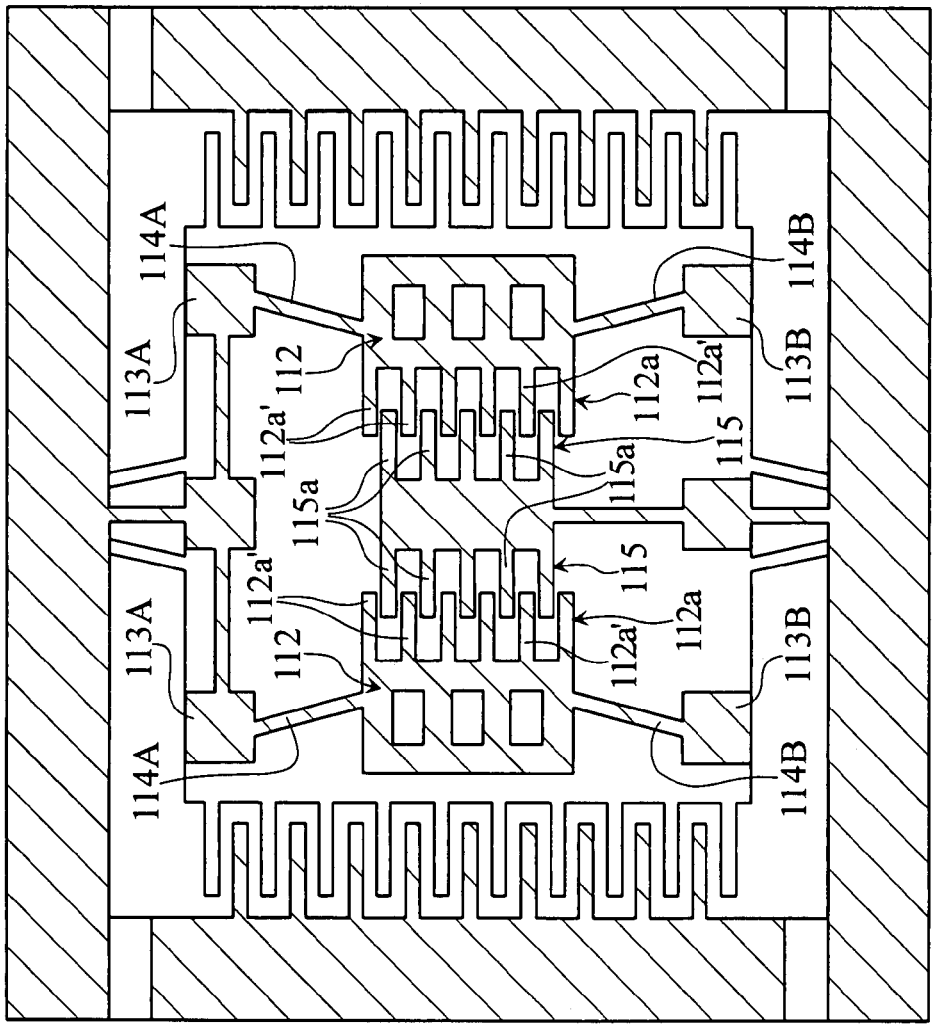
FIG. 8 is a plan view showing a position control mode of a weight portion.

Upon generating a desired static attractive force by applying the predetermined potential to each of the comb electrodes 112a, 115, each comb electrode 112a is attracted into the oppositely located comb electrode 115. Each weight portion 112 is set still at a position where the sum of the restoring force of the supporting beams 114A, 114B, which are now elastically deformed, and the static attractive force are balanced, as shown in FIG. 8. Adjusting the potential to be applied to the comb electrodes 112a, 115 allows controlling the static attractive force generated between the comb electrodes 112a, 115, and hence controlling the position where each weight portion 112 is set still, in other words the distance of each weight portion 112 from the oscillation axial center A1.

In the micromirror element X1, whereas the oscillating portion 110 includes the weight portion 112 which can be displaced in a direction intersecting the oscillation axial center A1 (in this embodiment, a direction orthogonal thereto), the displacement of the weight portion 112 provokes fluctuation in inertia I of the oscillating portion 110 (inertia I herein includes the inertia component of the respective portions constituting the oscillating portion 110). The closer to the oscillation axial center A1 the weight portion 112 is located, i.e. the smaller the rotation radius of the weight portion 112 is, the smaller inertia component the weight portion 112 gains and the smaller inertia I the oscillating portion 110 gains. The farther from the oscillation axial center A1 the weight portion 112 is located, i.e. the larger the rotation radius of the weight portion 112 is, the greater inertia component the weight portion 112 gains and the greater inertia I the oscillating portion 110 gains. As is understood from the foregoing equation (1), the smaller the inertia I of the oscillating portion 110 is, the higher the natural frequency (resonance frequency) f relevant to the oscillating motion of the oscillating portion becomes, and the greater the inertia I is, the lower the natural frequency f becomes.

The micro-oscillation element X1 thus constructed allows, therefore, controlling the inertia I of the oscillating portion 110 by displacing the weight portion 112 of the oscillating portion 110, thereby adjusting the natural frequency f relevant to the oscillating motion of the oscillating portion 110. Such adjusting method of the natural frequency allows analogically adjusting the natural frequency f relevant to the oscillating motion of the oscillating portion in finer increments, and hence with higher accuracy, than the conventional natural frequency adjustment by the mechanical process.

The micromirror element X1 also eliminates the need of performing the mechanical process on the oscillating portion 110 for adjusting the natural frequency f, after once completing the formation of the chip. Moreover, the micromirror element X1 equally permits increasing or decreasing the inertia I of the oscillating portion 110, thereby providing a higher degree of freedom in adjusting the natural frequency f.

FIGS. 9 to 14 illustrate a micromirror element X2 according to a second embodiment of the present invention.

Figure 9:
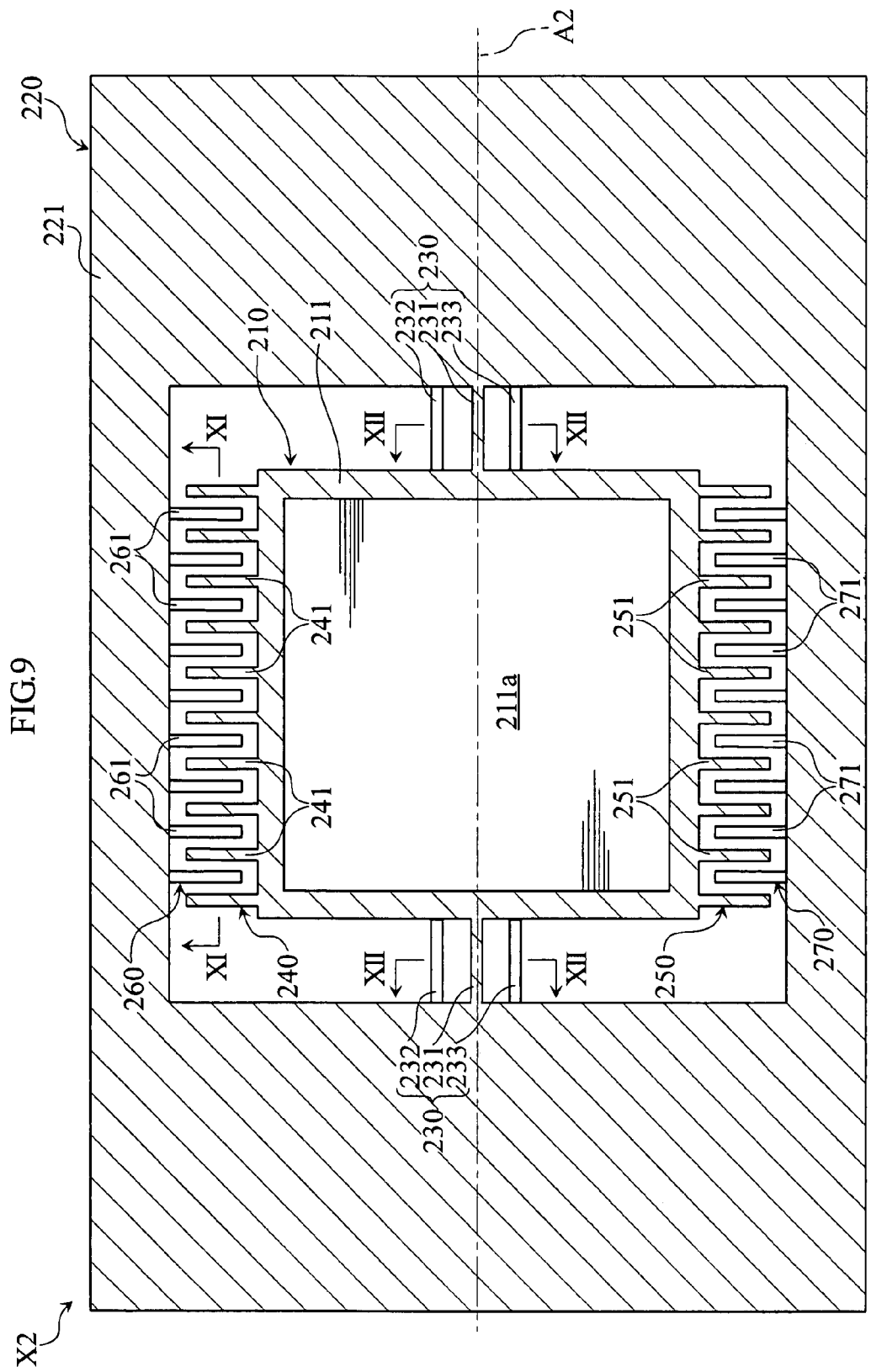
FIG. 9 is a plan view showing a micromirror element according to a second embodiment of the present invention.
Figure 10:
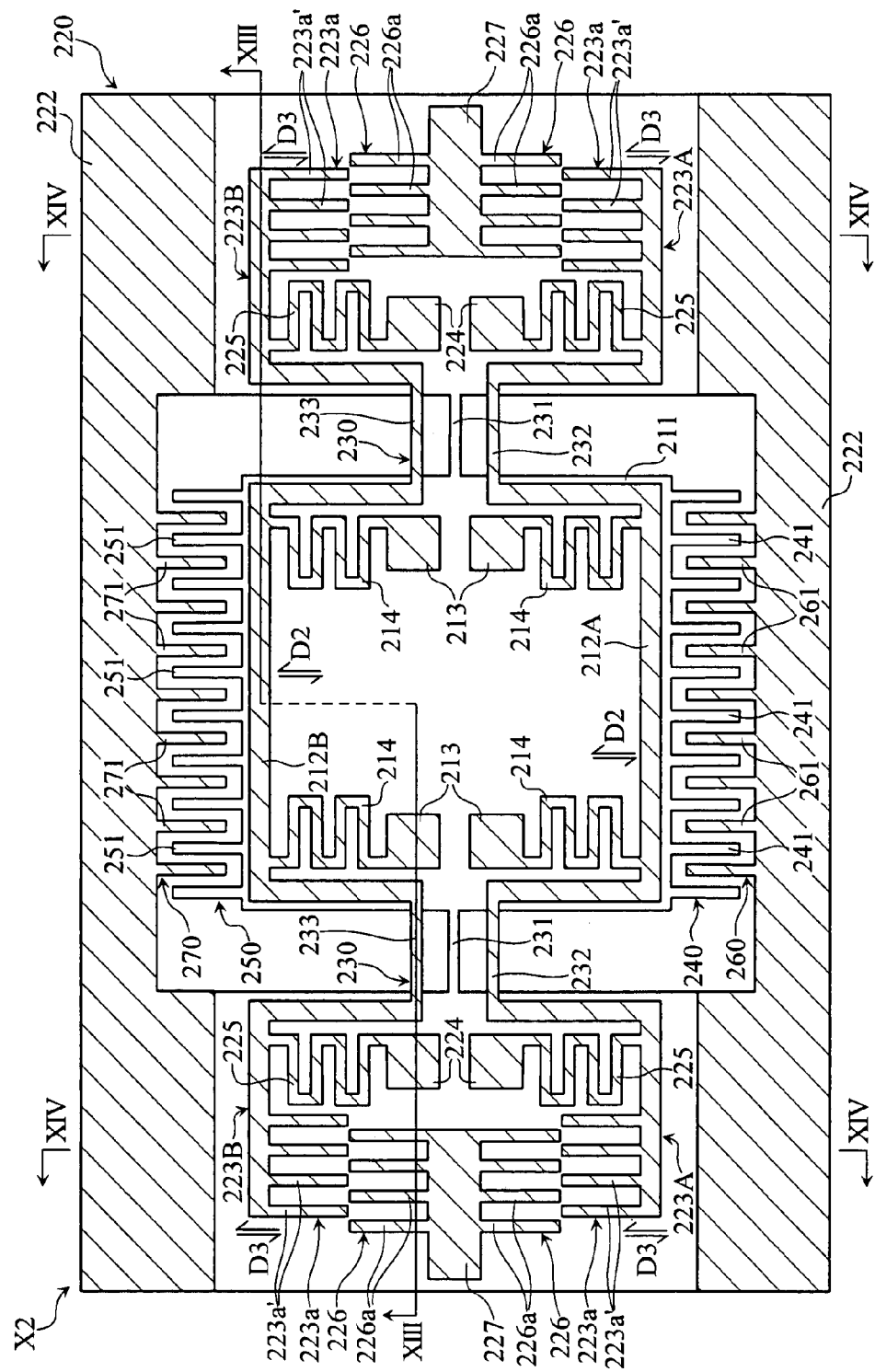
FIG. 10 is another plan view showing the micromirror element according to the second embodiment of the present invention.
Figure 11:
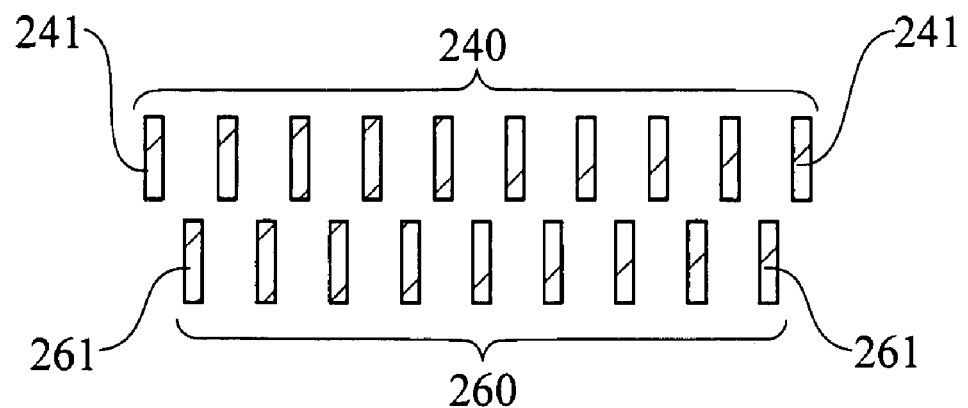
FIG. 11 is a cross-sectional view taken along a line XI-XI in FIG. 9.
Figure 12:
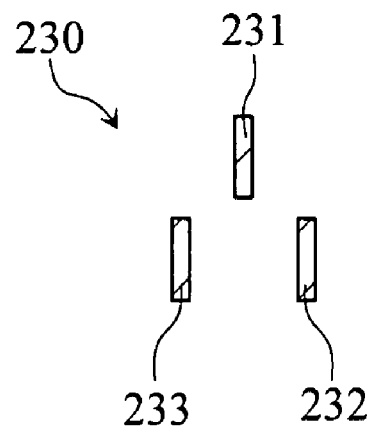
FIG. 12 is a cross-sectional view taken along a line XII-XII in FIG. 9.

FIG. 9 is a plan view showing the micromirror element X2, and FIG. 10 is another plan view showing the micromirror element X2. FIGS. 11 and 12 are cross-sectional views taken along a line XI-XI and XII-XII in FIG. 9. FIGS. 13 and 14 are cross-sectional views taken along a line XIII-XIII and XIV-XIV in FIG. 10.

The micromirror element X2 includes an oscillating portion 210, a frame 220, a pair of link portions 230, and comb electrodes 240, 250, 260, 270. The micromirror element X2 is herein assumed to be manufactured through processing a material substrate which is so called a silicon-on-insulator (SOI) substrate, by a bulk micromachining technique such as a MEMS technique. The material substrate has a multilayer structure including, for example, a first and a second silicon layer, and an insulating layer interposed between the silicon layers, which are given a predetermined conductivity by doping an impurity. FIG. 9 is a plan view primarily illustrating a structure originating from the first silicon layer, while FIG. 10 primarily depicts a structure originating from the second silicon layer. For the sake of explicitness of the drawings, hatched sections in FIG. 9 indicate the portion originating from the first silicon layer and located closer to the viewer than the insulating layer (except for a mirror surface 211a to be described later), and hatched sections in FIG. 10 indicate the portion originating from the second silicon layer and located closer to the viewer than the insulating layer.

The oscillating portion 210 includes a main oscillating body 211, a pair of movable portions 212A, 212B, four supporting bases 213, and four spring portions 214, and is set to oscillate about the frame 220.

The main oscillating body 211 is formed on the first silicon layer, and includes on its surface a mirror surface 211a capable of reflecting light, for example as shown in FIG. 9. The mirror surface 211a has a multilayer structure including a Cr layer deposited on the first silicon layer and an Au layer formed on the Cr layer.

As may be understood upon collectively referring to FIGS. 10 and 13, each of the movable portions 212A, 212B is attached to the main oscillating body 211 via the supporting base 213 fixed to the main oscillating body 211 via the insulating layer 215, and the spring portion 214 connecting the supporting base 213 and the relevant movable portion, and can be displaced as indicated by arrows D2 in FIG. 10. The movable portions 212A, 212B, the supporting base 213, and the spring portion 214 are members formed on the second silicon layer.

The frame 220 includes a first layered structure 221, a second layered structure 222, two movable portions 223A, two movable portions 223B, four supporting bases 224, four spring portions 225, four comb electrodes 226, and two interconnect portions 227, and is formed to surround the oscillating portion 210. The first layered structure 221 is a member formed on the first silicon layer. The second layered structure 222 is a member formed on the second silicon layer. The first and the second layered structure 221, 222 are joined via the insulating layer 228. The movable portions 223A, 223B, the supporting base 224, the spring portion 225, the comb electrode 226, and the interconnect portion 227 are members formed on the second silicon layer.

As may be understood upon collectively referring to FIGS. 10, 13 and 14, each of the movable portions 223A, 223B is attached to the first layered structure 221 via the supporting base 224 fixed to the first layered structure 221 via the insulating layer 215, and the spring portion 225 connecting the supporting base 224 and the relevant movable portion, and can be displaced as indicated by arrows D3 in FIG. 10. Also, each movable portion 223A, 223B includes a comb electrode 223a having a plurality of parallelly aligned electrode teeth 223a'. Each comb electrode 223a of the movable portions 223A, 223B constitutes a movable electrode in a movable portion displacement mechanism.

Each comb electrode 226 serves to generate a static attractive force in cooperation with the comb electrode 223a of the movable portions 223A, 223B, and includes a plurality of parallelly aligned electrode teeth 226a fixed to the interconnect portion 227 as shown in FIG. 10. The interconnect portion 227 is fixed to the first layered structure 221 via the insulating layer 228, as shown in FIG. 14. Each comb electrode 226 fixed to the interconnect portion 227, which is fixed to the first layered structure 221, constitutes a fixed electrode in the movable portion displacement mechanism.

The pair of link portions 230 respectively includes three torsion bars 231, 232, 233 as shown in FIGS. 9, 10, and 12, thereby connecting the oscillating portion 210 and the frame 220. Each torsion bar 231 is a member formed on the first silicon layer, and connects, as shown in FIG. 9, the main oscillating body 211 of the oscillating portion 210 and the first layered structure 221 of the frame 220. The torsion bars 232, 233 are members formed on the second silicon layer. As shown in FIG. 10, an end portion of the torsion bar 232 is connected the movable portion 212A of the oscillating portion 210, and the other end portion of the torsion bar 232 is connected to the movable portion 223A of the frame 220. An end portion of the torsion bar 233 is connected the movable portion 212B of the oscillating portion 210, and the other end portion of the torsion bar 233 is connected to the movable portion 223B of the frame 220. In each link portion 230, the torsion bars 231, 232, 233 are parallel to one another, and the torsion bar 231 and the torsion bars 232, 233 are electrically isolated. The pair of link portions 230 thus configured defines an oscillation axial center A2 of the rotating motion of the oscillating portion 210 about the frame 220.

The comb electrode 240 includes a plurality of electrode teeth 241 formed on the first silicon layer, and the electrode teeth 241 respectively extend from the main oscillating body 211 of the oscillating portion 210 and are mutually parallel, for example as shown in FIG. 9.

The comb electrode 250 includes a plurality of electrode teeth 251 formed on the first silicon layer, and the electrode teeth 251 respectively extend from the main oscillating body 211 of the oscillating portion 210 on the opposite side to the electrode teeth 241 of the comb electrode 240, and are mutually parallel, for example as shown in FIG. 9.

The comb electrode 260 serves to generate a static attractive force in cooperation with the comb electrode 240, and includes a plurality of electrode teeth 261 originating from the second silicon layer. The electrode teeth 261 respectively extend from the second layered structure 222 of the frame 220, and are parallel to one another, as well as to the electrode teeth 241 of the comb electrode 240, as shown in FIG. 10. The comb electrodes 240, 260 are disposed such that the position of each electrode tooth 241, 261 is shifted from one another, for example as shown in FIG. 11. The pair of comb electrodes 240, 260 constitutes an actuator in the micromirror element X2.

The comb electrode 270 serves to generate a static attractive force in cooperation with the comb electrode 250, and includes a plurality of electrode teeth 271 originating from the second silicon layer. The electrode teeth 271 respectively extend from the second layered structure 222 of the frame 220, and are parallel to one another, as well as to the electrode teeth 251 of the comb electrode 250, as shown in FIG. 10. The pair of comb electrodes 250, 270 constitutes an actuator in the micromirror element X2. The comb electrodes 250, 270 are disposed such that the position of each electrode tooth 251, 271 is shifted from one another. Also, the region of the second layered structure 222 connected to the comb electrode 260 and the region of the second layered structure 222 connected to the comb electrode 270 are electrically isolated, and hence these comb electrodes 260, 270 are electrically isolated.

The micromirror element X2 is, as already stated, manufactured through processing the material substrate having a multilayer structure by a bulk micromachining technique such as a MEMS technique. The material substrate in this embodiment has, as stated above, the multilayer structure including the first and the second silicon layer, and the insulating layer interposed between the silicon layers.

To manufacture the micromirror element X2, etching processes are performed at predetermined timings on the material substrate, utilizing, for example, etching masks that cover the regions corresponding to the main oscillating body 211, the first layered structure 221, and the torsion bar 231, as well as etching masks that cover the regions corresponding to the movable portions 212A, 212B, the supporting base 213, the spring portion 214, the second layered structure 222, the movable portions 223A, 223B, the supporting base 224, the spring portion 225, the comb electrode 226, the interconnect portion 227, and the torsion bars 232, 233 as the case may be, thereby processing the respective silicon layers. Suitable etching methods include a dry etching such as Deep RIE, and a wet etching such as KOH. Unnecessary portions of the insulating layer are duly removed in each etching process. Through such steps, the respective portions of the micromirror element X2 are formed on the material substrate including the first and the second silicon layer and the insulating layer.

In the micromirror element X2, applying a predetermined potential to each of the comb electrodes 240, 250, 260, 270 as required can cause the oscillating portion 210 to oscillate or to be rotationally displaced about the oscillation axial center A2. The potential may be applied to the comb electrodes 240, 250 through the first layered structure 221 of the frame 220, the torsion bar 231 of each link portion 230, and the main oscillating body 211 of the oscillating portion 210. The comb electrodes 240, 250 may be, for example, grounded. The potential may be applied to the comb electrode 260 through a part of the second layered structure 222 of the frame 220, and to the comb electrode 270 through another part of the second layered structure 222. Since the comb electrode 260 and the comb electrode 270 are electrically isolated as already stated, the potential can be independently applied to each of the comb electrodes 260, 270.

Upon generating a desired static attractive force by applying the predetermined potential to each of the comb electrodes 240, 260, the comb electrode 240 is attracted into the comb electrode 260. This causes the oscillating portion 210 to oscillate about the oscillation axial center A2, thus rotationally displacing the oscillating portion 210 until the static attractive force and the sum of the torsional resistance of each link portion 230, which is now torsionally deformed, are balanced. The amount of such rotational displacement of the oscillating motion may be controlled by adjusting the potential to be applied to the comb electrodes 240, 260. Upon turning off the static attractive force between the comb electrodes 240, 260, each link portion 230 (torsion bars 231, 232, 233) releases the torsional stress thus restoring the natural state.

Likewise, upon generating a desired static attractive force by applying the predetermined potential to each of the comb electrodes 250, 270, the comb electrode 250 is attracted into the comb electrode 270. This causes the oscillating portion 210 to oscillate about the oscillation axial center A2 in the opposite direction to the case of the foregoing paragraph, thus rotationally displacing the oscillating portion 210 until the static attractive force and the sum of the torsional resistance of each link portion 230, which is now torsionally deformed, are balanced. The amount of such rotational displacement of the oscillating motion may be controlled by adjusting the potential to be applied to the comb electrodes 250, 270. Upon turning off the static attractive force between the comb electrodes 250, 270, each link portion 230 (torsion bars 231, 232, 233) releases the torsional stress thus restoring the natural state.

In the micromirror element X2, driving thus the oscillating motion of the oscillating portion 210 can switch as desired the direction of light reflected by the mirror surface 211a provided on the main oscillating body 211.

Also, in the micromirror element X2, applying a predetermined potential as required to the comb electrodes 226, with the respective facing four comb electrodes 223a (namely the movable portion 223A, 223B of the frame 220) being grounded can change a distance between the torsion bars 232, 233 of each link portion 230. The grounding of the comb electrodes 223a may be achieved, for example, by providing a conductive plug through the insulating layer 228 to electrically connect the supporting base 224 and the first layered structure 221, and then grounding the first layered structure 221. The potential may be applied to the comb electrode 226 through the interconnect portion 227.

Figure 15:
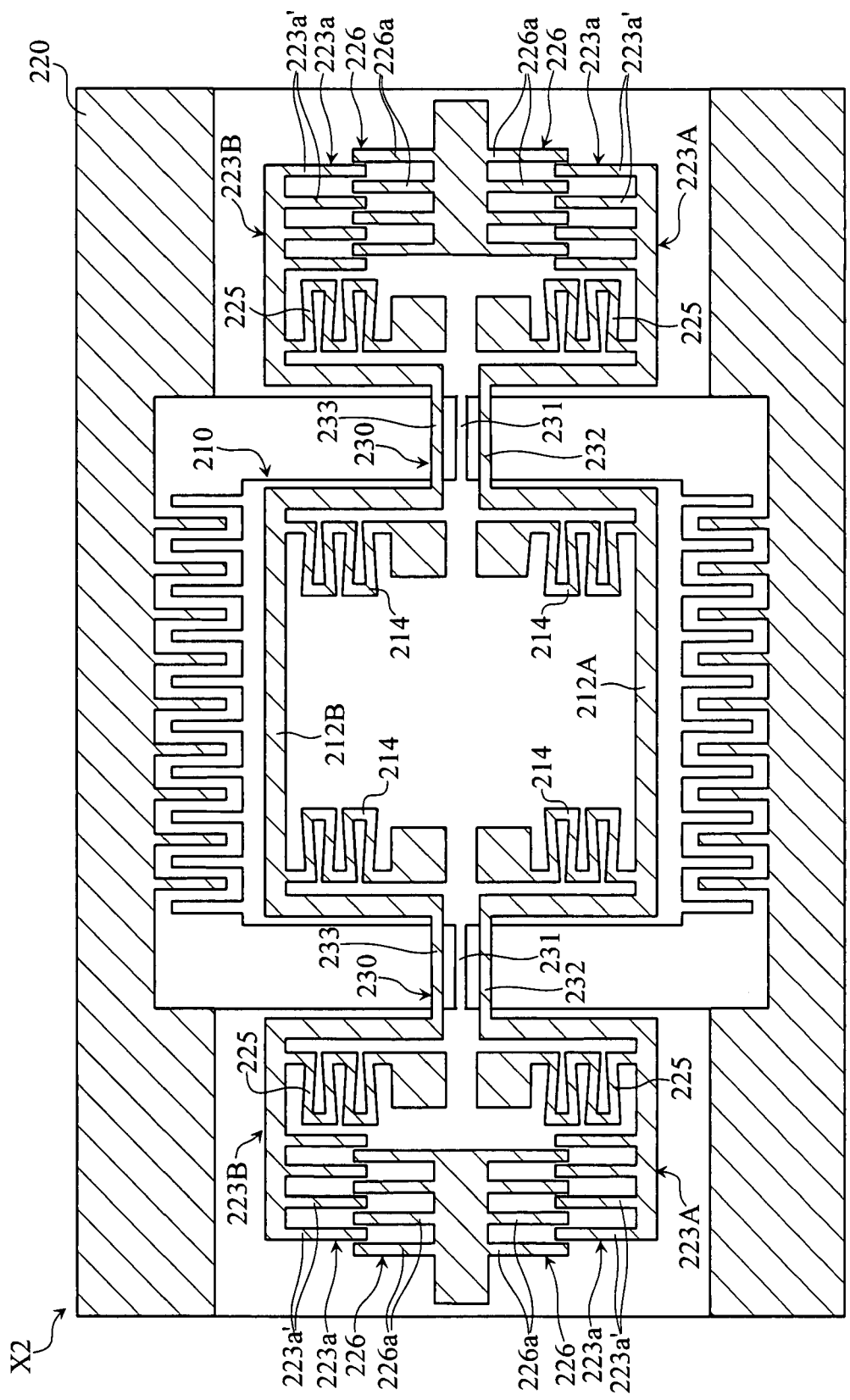
FIG. 15 is a plan view showing a width control mode of link portions.

Upon generating a desired static attractive force between the oppositely disposed comb electrodes 223a, 226 by applying the predetermined potential to the comb electrode 226, each comb electrode 223a is attracted into the facing comb electrode 226. This displaces the movable portion 223A as well as the torsion bar 232 and the movable portion 212A, and also the movable portion 223B as well as the torsion bar 233 and the movable portion 212B. A movable unit including the movable portions 212A, 223A and the torsion bar 232 is set still at a position where the sum of the restoring force of the spring portions 214, 225, which are now elastically deformed because of being connected to the movable unit, and the static attractive force acting on the two points on the movable unit are balanced, for example as shown in FIG. 15. Concurrently, a movable unit including the movable portions 212B, 223B and the torsion bar 233 is set still at a position where the sum of the restoring force of the spring portions 214, 225, which are now elastically deformed because of being connected to the movable unit, and the static attractive force acting on the two points on the movable unit are balanced, for example as shown in FIG. 15. Adjusting the potential to be applied to the comb electrode 226 allows controlling the static attractive force generated between the mutually facing comb electrodes 223a, 226, and hence controlling the position where the torsion bars 232, 233 of each link portion 230 are set still, in other words the distance between the torsion bars 232, 233.

In the micromirror element X2, whereas the link portion 230 includes two torsion bars 232, 233 that can move closer to or away from each other, the movement of the torsion bars 232, 233 closer to or away from each other causes a change in torsion spring constant k of each link portion 230. The shorter the distance between the torsion bars 232, 233 is, the smaller torsion spring constant k the link portion 230 including the torsion bars 232, 233 gains. The longer the distance between the torsion bars 232, 233 is, the greater torsion spring constant k the link portion 230 gains. As is understood from the foregoing equation (1), the smaller the torsion spring constant k of the link portion 230 is, the higher the natural frequency (resonance frequency) f relevant to the oscillating motion of the oscillating portion becomes, and the greater the torsion spring constant k is, the lower the natural frequency f becomes.

The micro-oscillation element X2 thus constructed allows, therefore, controlling the torsion spring constant k of the link portion 230 by moving the torsion bars 232, 233 closer to or away from each other, thereby adjusting the natural frequency f relevant to the oscillating motion of the oscillating portion 210. Such adjusting method of the natural frequency allows analogically adjusting the natural frequency f relevant to the oscillating motion of the oscillating portion in finer increments, and hence with higher accuracy, than the conventional natural frequency adjustment by the mechanical process.

The micromirror element X2 also eliminates the need of performing the mechanical process on the oscillating portion 210 for adjusting the natural frequency f, after once completing the formation of the chip. Moreover, the micromirror element X2 equally permits increasing or decreasing the torsion spring constant k of the link portion 230, thereby providing a higher degree of freedom in adjusting the natural frequency f.

Although the drive mechanism that serves to displace the movable unit is provided on the side of the frame 220 in this embodiment, the present invention also includes a structure in which the drive mechanism that displaces the movable unit is provided on the side of the oscillating portion 210. In this case, the oscillating portion 210 of the micromirror element X2 may include two first comb electrodes fixed to the main oscillating body 211, and the movable portion 212A may include a second comb electrode that generates a static attractive force in cooperation with one of the first comb electrodes, while the movable portion 212B may include a second comb electrode that generates a static attractive force in cooperation with the other first comb electrode.

Figure 16:
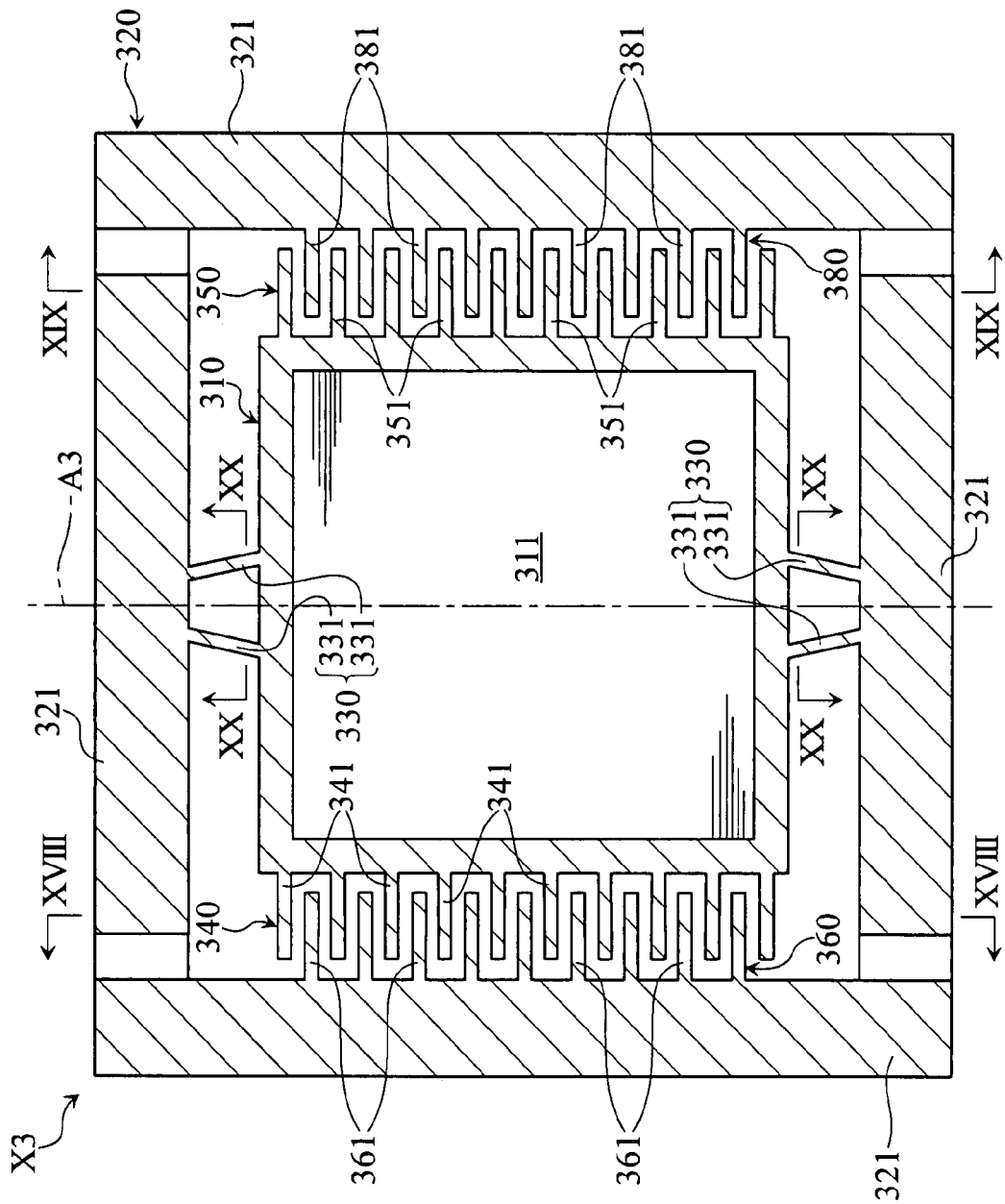
FIG. 16 is a plan view showing a micromirror element according to a third embodiment of the present invention.
Figure 17:
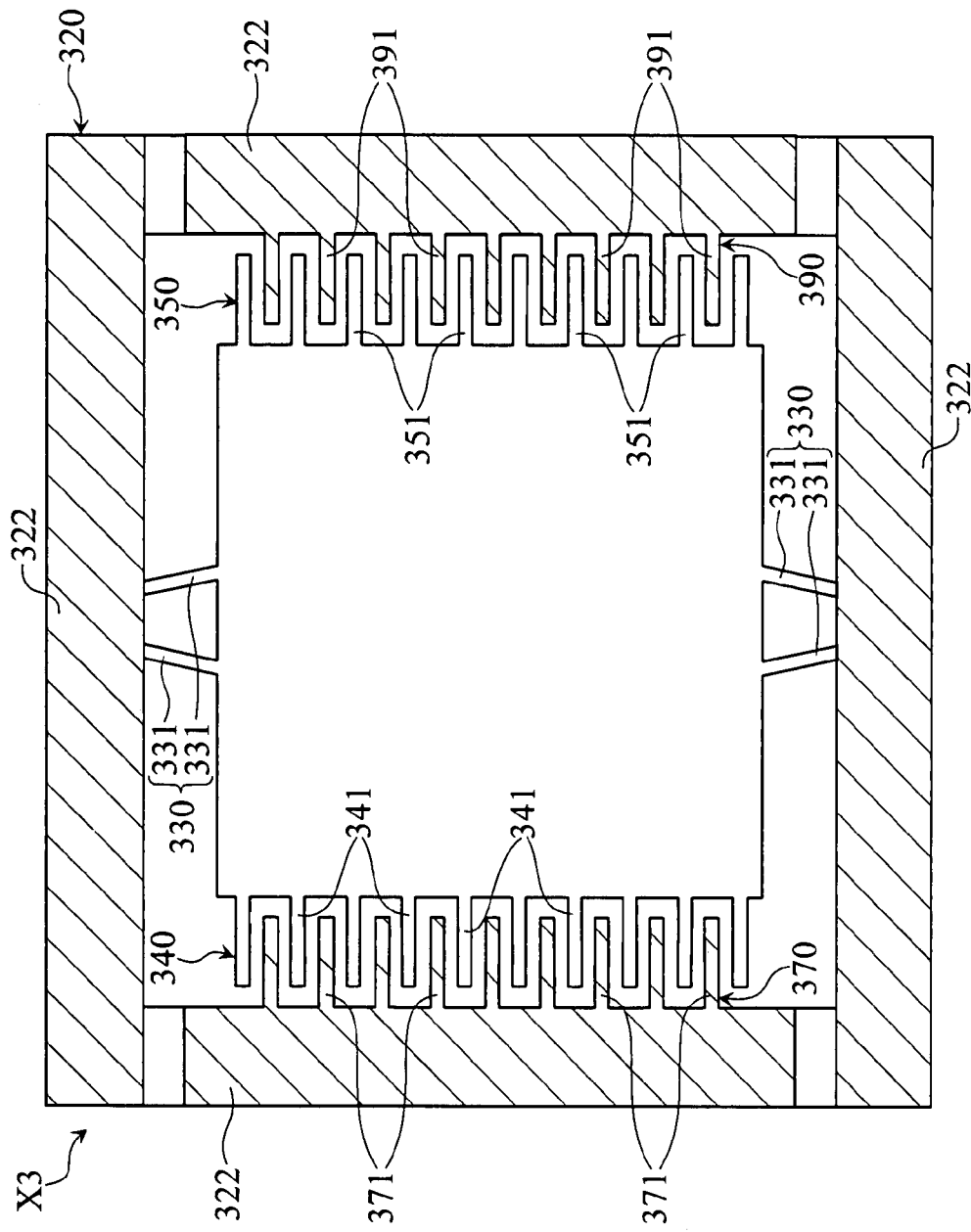
FIG. 17 is another plan view showing the micromirror element according to the third embodiment of the present invention.
Figure 18:
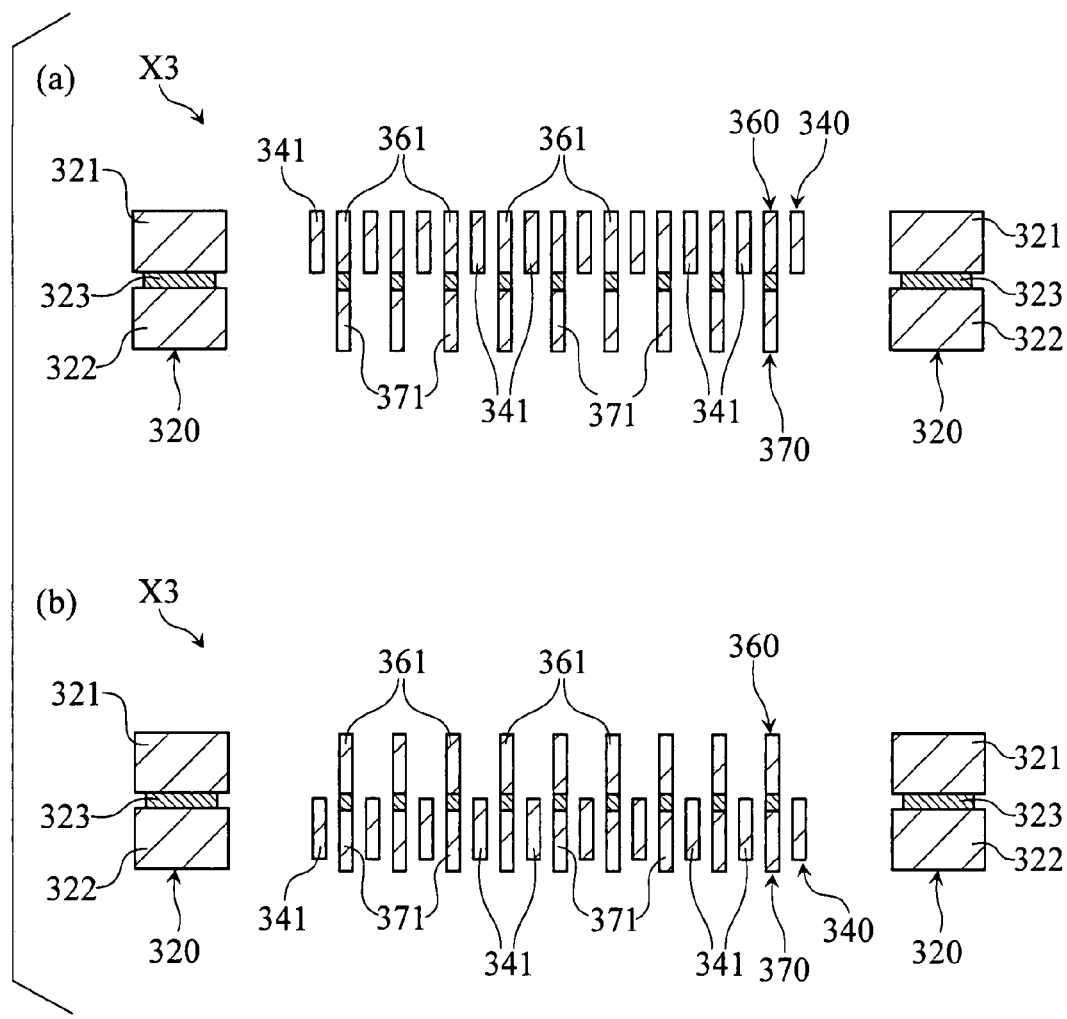
FIG. 18(*a*)-(*b*) is a cross-sectional view taken along a line XVIII-XVIII in FIG. 16.
Figure 19:
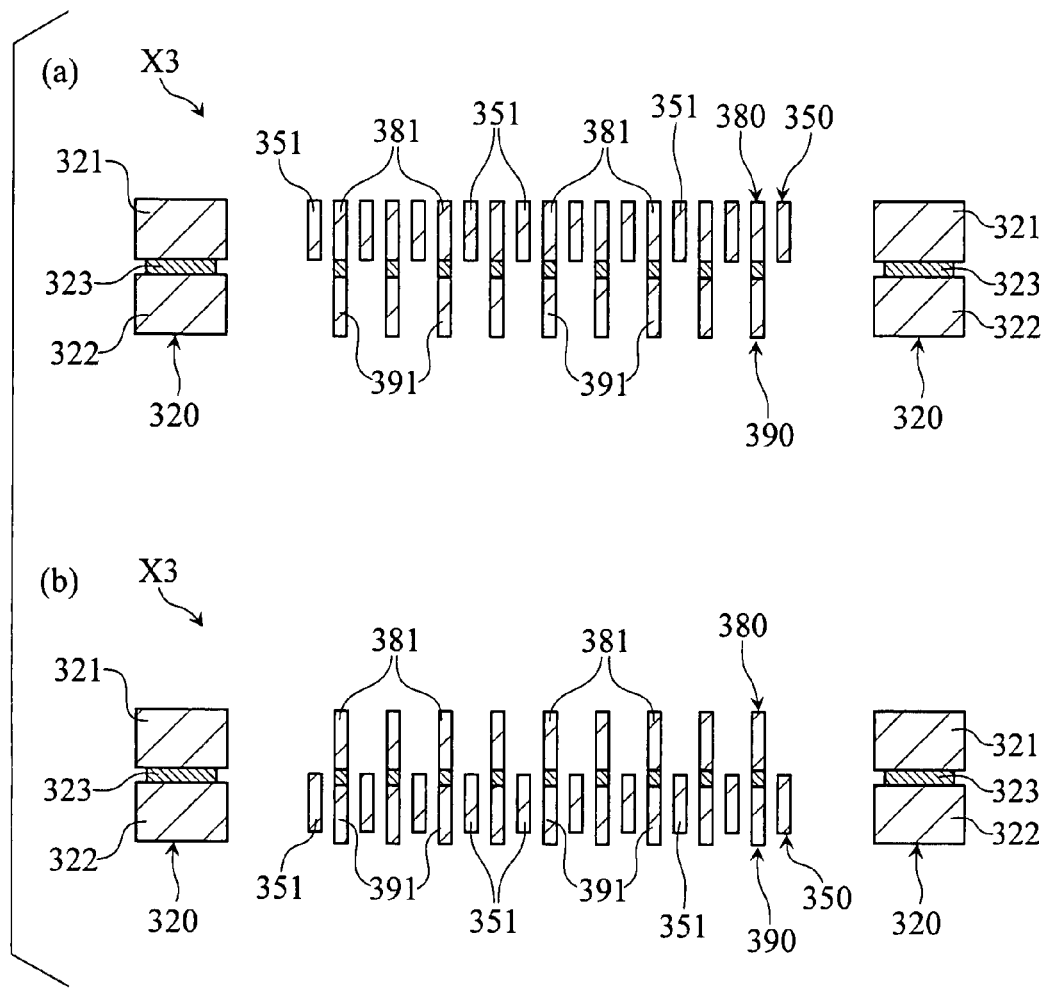
FIG. 19(*a*)-(*b*) is a cross-sectional view taken along a line XIX-XIX in FIG. 16.
Figure 20:
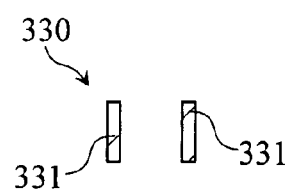
FIG. 20 is a cross-sectional view taken along a line XX-XX in FIG. 16.

FIGS. 16 to 20 illustrate a micromirror element X3 according to a third embodiment of the present invention. FIG. 16 is a plan view showing the micromirror element X3. FIG. 17 is another plan view showing the micromirror element X3. FIGS. 18 to 20 are cross-sectional views taken along a line XVIII-XVIII, XIX-XIX, and XX-XX in FIG. 16, respectively.

The micromirror element X3 includes an oscillating portion 310, a frame 320, a pair of link portions 330, and comb electrodes 340, 350, 360, 370, 380, 390. The micromirror element X3 is herein assumed to be manufactured through processing a material substrate which is so called a silicon-on-insulator (SOI) substrate, by a bulk micromachining technique such as a MEMS technique. The material substrate has a multilayer structure including, for example, a first and a second silicon layer, and an insulating layer interposed between the silicon layers, which are given a predetermined conductivity by doping an impurity. FIG. 16 is a plan view primarily illustrating a structure originating from the first silicon layer, while FIG. 17 primarily depicts a structure originating from the second silicon layer. For the sake of explicitness of the drawings, hatched sections in FIG. 16 indicate the portion originating from the first silicon layer and located closer to the viewer than the insulating layer (except for a mirror surface 311 to be described later), and hatched sections in FIG. 17 indicate the portion originating from the second silicon layer and located closer to the viewer than the insulating layer.

The oscillating portion 310 is formed on the first silicon layer, and includes on its surface a mirror surface 311 capable of reflecting light, as shown in FIG. 16. The mirror surface 311 has a multilayer structure including a Cr layer deposited on the first silicon layer and an Au layer formed on the Cr layer.

The frame 320 includes a first layered structure 321 and a second layered structure 322, and is formed to surround the oscillating portion 310. The first layered structure 321 is a member formed on the first silicon layer, and the second layered structure 322 is a member formed on the second silicon layer. The first and the second layered structure 321, 322 are joined via an insulating layer 323, as shown in FIGS. 18 and 19.

The pair of link portions 330 respectively includes two torsion bars 331 as shown in FIGS. 16, 17, and 20, thereby connecting the oscillating portion 310 and the frame 320. The torsion bars 331 are members formed on the first silicon layer, and connecting the oscillating portion 310 and the first layered structure 321 of the frame 320. The space between the torsion bars 331 of each link portion 330 is gradually widened in a direction from the frame 320 toward the oscillating portion 310. The pair of link portions 330 thus configured defines an oscillation axial center A3 of a rotating motion of the oscillating portion 310 about the frame 320. Each link portion 330 including the two torsion bars 331 defining therebetween a space gradually increasing from the frame 120 toward the oscillating portion 110 is advantageous in suppressing emergence of an unnecessary displacement component in the rotating motion of the oscillating portion 310.

The comb electrode 340 includes a plurality of electrode teeth 341 formed on the first silicon layer, and the electrode teeth 341 respectively extend from the oscillating portion 310 and are mutually parallel, for example as shown in FIG. 16.

The comb electrode 350 includes a plurality of electrode teeth 351 formed on the first silicon layer, and the electrode teeth 351 respectively extend from the oscillating portion 310 on the opposite side of the electrode teeth 341 of the comb electrode 340, and are mutually parallel, for example as shown in FIG. 16.

The comb electrode 360 serves to generate a static attractive force in cooperation with the comb electrode 340. The comb electrode 360 is fixed to the frame 320 at a position facing the comb electrode 340 when the oscillation drive of the chip is off, and includes a plurality of electrode teeth 361 originating from the first silicon layer. The electrode teeth 361 respectively extend from the first layered structure 321 and are parallel to one another, as well as to the electrode teeth 341 of the comb electrode 340, as shown in FIG. 16.

The comb electrode 370 serves to generate a static attractive force in cooperation with the comb electrode 340. The comb electrode 370 is fixed to the frame 320 at a position not facing the comb electrode 340 when the oscillation drive is off, and includes a plurality of electrode teeth 371 originating from the first silicon layer. The electrode teeth 371 respectively extend from the second layered structure 322 and are parallel to one another, as well as to the electrode teeth 341, 361 of the comb electrodes 340, 360, as shown in FIG. 17. It is preferable that an insulating member is interposed between the electrode teeth 371 of the comb electrode 370 and the electrode teeth 361 of the comb electrode 360.

The comb electrode 380 serves to generate a static attractive force in cooperation with the comb electrode 350. The comb electrode 380 is fixed to the frame 320 at a position facing the comb electrode 350 when the oscillation drive is off, and includes a plurality of electrode teeth 381 originating from the first silicon layer. The electrode teeth 381 respectively extend from the first layered structure 321 and are parallel to one another, as well as to the electrode teeth 351 of the comb electrode 350, as shown in FIG. 16.

The comb electrode 390 serves to generate a static attractive force in cooperation with the comb electrode 350. The comb electrode 390 is fixed to the frame 320 at a position not facing the comb electrode 350 when the oscillation drive is off, and includes a plurality of electrode teeth 391 originating from the first silicon layer. The electrode teeth 391 respectively extend from the second layered structure 322 and are parallel to one another, as well as to the electrode teeth 351, 381 of the comb electrodes 350, 380, as shown in FIG. 17. It is preferable that an insulating member is interposed between the electrode teeth 391 of the comb electrode 390 and the electrode teeth 381 of the comb electrode 380.

The comb electrodes 340, 350 and the comb electrodes 360 to 390 are electrically isolated. Also, the comb electrodes 360 to 390 are electrically isolated from one another.

Regarding the comb electrodes 340 to 390, a set including the comb electrodes 340, 360, a set including the comb electrodes 340, 370, a set including the comb electrode 350, 380, and a set including the comb electrodes 350, 390 respectively constitute a drive mechanism according to the present invention. For example, the comb electrodes 360 to 390 are respectively electrically connected to a voltage generating mechanism capable of controlling the magnitude of the potential to be applied and the duration in time for applying the potential. Such configuration allows, in the drive mechanism including the comb electrodes 340, 360, controlling the magnitude of the static attractive force generated between the comb electrodes 340, 360, and the generating period of the static attractive force. Likewise, in the drive mechanism including the comb electrodes 340, 370, the magnitude of the static attractive force generated between the comb electrodes 340, 370, and the generating period of the static attractive force can be controlled; in the drive mechanism including the comb electrodes 350, 380, the magnitude of the static attractive force generated between the comb electrodes 350, 380, and the generating period of the static attractive force can be controlled; and in the drive mechanism including the comb electrodes 350, 390, the magnitude of the static attractive force generated between the comb electrodes 350, 390, and the generating period of the static attractive force can be controlled.

The micromirror element X3 is, as already stated, manufactured through processing the material substrate having a multilayer structure by a bulk micromachining technique such as a MEMS technique. The material substrate in this embodiment has, as stated above, the multilayer structure including the first and the second silicon layer, and the insulating layer interposed between the silicon layers.

To manufacture the micromirror element X3, etching processes are performed at predetermined timings on the material substrate, utilizing, for example, etching masks that cover the regions corresponding to the oscillating portion 310, the first layered structure 321, the torsion bar 331, and the comb electrodes 340, 350, 360, 380, as well as etching masks that cover the regions corresponding to the second layered structure 322 and the comb electrodes 370, 390 as the case may be, thereby processing the respective silicon layers. Suitable etching methods include a dry etching such as Deep RIE, and a wet etching such as KOH. Unnecessary portions of the insulating layer are duly removed in each etching process. Through such steps, the respective portions of the micromirror element X3 are formed on the material substrate including the first and the second silicon layer and the insulating layer.

In the micromirror element X3, applying a predetermined potential to each of the comb electrodes 340 to 390 as required can cause the oscillating portion 310 to rotate about the oscillation axial center A3, thereby switching as desired the direction of light reflected by the mirror surface 311 provided on the oscillating portion 310.

Figure 21:
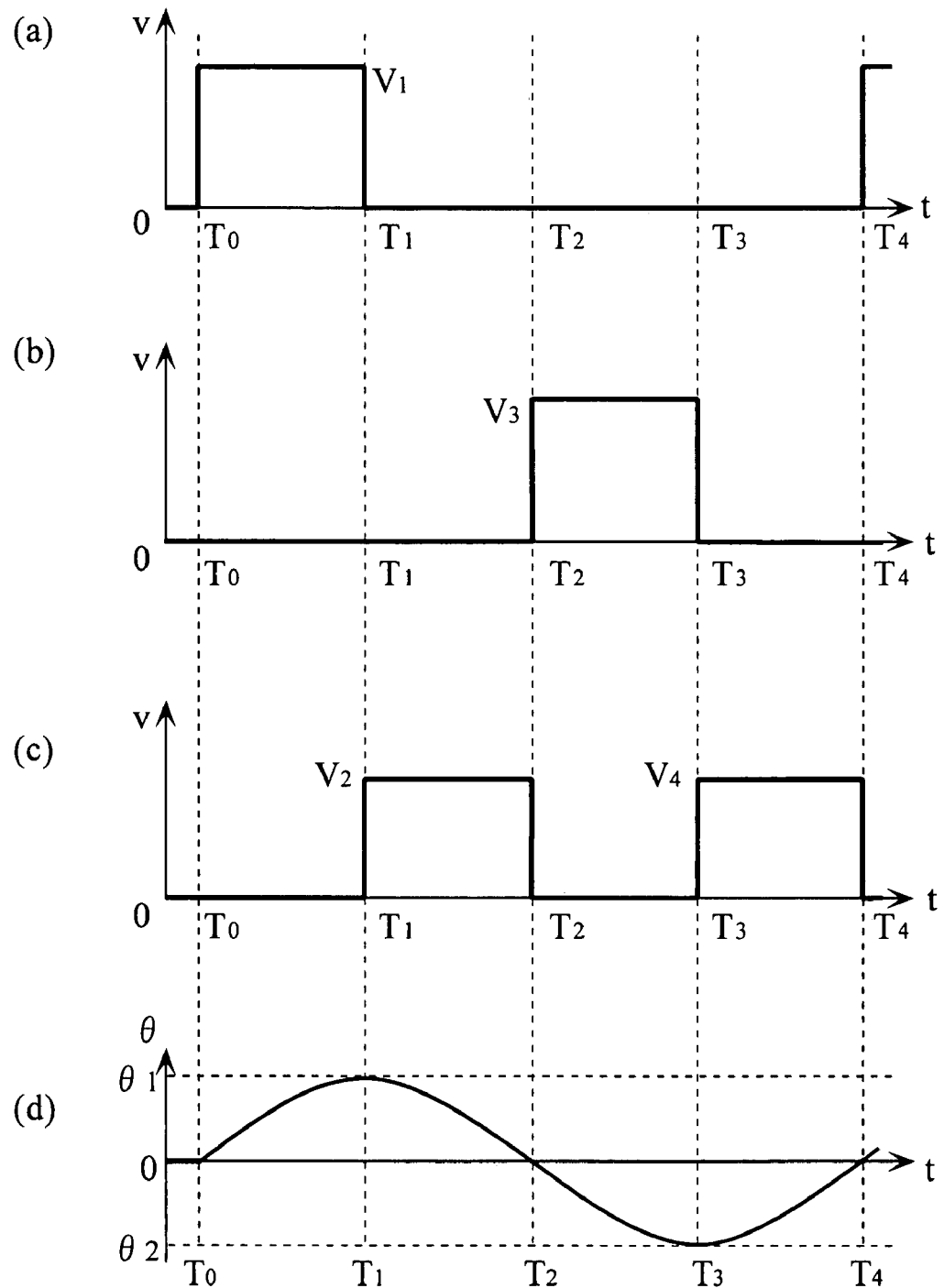
FIG. 21 is a diagram illustrating an example of the drive mode of the micromirror element shown in FIG. 16.

FIG. 21(*a*)-(*d*) illustrates a drive mode of the micromirror element X3. The drive mode shown therein is an example of the normal drive. FIG. 21(*a*) depicts a change with time of a voltage applied to the comb electrode 370. FIG. 21(*b*) depicts a change with time of a voltage applied to the comb electrode 390. FIG. 21(*c*) depicts a change with time of a voltage applied to the comb electrodes 360, 380. In this drive mode, the comb electrodes 340, 350 are grounded. In each graph of FIG. 21(*a*)-(*c*), the horizontal axis represents the time (t), and the vertical axis represents the voltage applied (v). FIG. 21(*d*) depicts a change with time of the oscillation angle of the oscillating portion under this drive mode. In the graph of FIG. 21(*d*), the horizontal axis represents the time (t), and the vertical axis represents the oscillation angle (θ).

Under this drive mode, firstly during the period from the time $T_0$ time $T_1$, a predetermined voltage $V_1$ is applied as shown in FIG. 21(*a*) to the comb electrode 370 of the micromirror element X3 in an initial state (oscillation angle of the oscillating portion 310 is 0°) at the time $T_0$, so that the rotational displacement of the oscillating portion 310 reaches a maximal oscillation angle $\theta_1$ at the time $T_1$. Between the time $T_0$ and the time $T_1$, a static attractive force is generated between the comb electrode 370 and the comb electrode 340, and the oscillation angle of the oscillating portion 310 continues to increase in a first oscillation direction. At the time $T_1$, the set of comb electrodes 340, 370 are oriented for example as shown in FIG. 18(b), and the oscillation angle reaches $\theta_1$ as shown in FIG. 21(d). At this moment, each link portion 330 incurs a predetermined torsional stress.

Then a predetermined voltage $V_2$ is applied to the comb electrodes 360, 380 during the period from the time $T_1$ to the time $T_2$, as shown in FIG. 21(c). During this period, a static attractive force is generated between the comb electrodes 340, 360 and between the comb electrodes 350, 380, in addition to the torsional stress of each link portion 330 acting as a restoring force, so that the oscillation angle of the oscillating portion 310 continues to decrease. At the time $T_2$, the set of comb electrodes 340, 360 are oriented as shown in FIG. 18(a); the set of comb electrodes 350, 380 are oriented as shown in FIG. 19(a); and the oscillation angle reaches 0° as shown in FIG. 21(d).

A predetermined voltage $V_3$ is then applied to the comb electrode 390 during the period from the time $T_2$ to the time $T_3$ as shown in FIG. 21(b), so that the rotational displacement of the oscillating portion 310 reaches a maximal oscillation angle $\theta_2$ at the time $T_3$. From the time $T_2$ to the time $T_3$, a static attractive force is generated between the comb electrode 390 and the comb electrode 350, and the oscillation angle of the oscillating portion 310 continues to increase in a second oscillation direction opposite to the first oscillation direction. At the time $T_3$, the set of comb electrodes 350, 390 are oriented for example as shown in FIG. 19(b), and the oscillation angle reaches $\theta_2$ as shown in FIG. 21(d). At this moment, each link portion 330 incurs a predetermined torsional stress.

Then a predetermined voltage $V_4$ is applied to the comb electrodes 360, 380 during the period from the time $T_3$ to the time $T_4$, as shown in FIG. 21(c). During this period, a static attractive force is generated between the comb electrodes 340, 360 and between the comb electrodes 350, 380, in addition to the torsional stress of each link portion 330 acting as a restoring force, so that the oscillation angle of the oscillating portion 310 continues to decrease. At the time $T_4$, the set of comb electrodes 340, 360 are oriented as shown in FIG. 18(a); the set of comb electrodes 350, 380 are oriented as shown in FIG. 19(a); and the oscillation angle reaches 0° as shown in FIG. 21(d). Such series of application of the voltage from the time $T_0$ the time $T_4$, and the resultant oscillating motion of the oscillating portion 310 are repeated as required.

In the normal drive mode of the micromirror element X3, in order to apply a constantly identical rotational torque to the oscillating portion 310 for its oscillating motion, the voltage $V_1$ and the voltage $V_3$ are set to be identical; the voltage $V_2$ and the voltage $V_4$ are set to be identical; the voltages $V_2$, $V_4$ are set to be lower than the voltages $V_1$, $V_3$ by a predetermined amount; and the periods between the time $T_0$ and the time $T_1$, between the time $T_1$ and the time $T_2$, between the time $T_2$ and the time $T_3$, and between the time $T_3$ and the time $T_4$ are set to be the same, specifically a quarter of the frequency of the oscillating motion of the oscillating portion 310, respectively. The absolute value of the oscillation angle $\theta_1$ is identical to the absolute value of the oscillation angle $\theta_2$. Performing the normal drive thus arranged, which constantly provides the identical rotational torque to the oscillating portion 310 for its oscillating motion, leads to cyclic oscillating motion of the oscillating portion 310 of the micromirror element X3.

Meanwhile, the micro-oscillation element X3 allows electrically creating, for adjusting the natural frequency f relevant to the oscillating motion of the oscillating portion 310, a state equivalent to increasing or decreasing the torsion spring constant k of the link portion 310. Specifically, changing the operation mode of a predetermined comb electrode from that of the respective comb electrodes under the normal drive, in which the comb electrodes are driven to constantly apply an identical rotational torque to the oscillating portion 310 in its oscillating motion, can create a state equivalent to increasing or decreasing the torsion spring constant of the link portion 310 in a part of the oscillation angle range of the oscillating motion of the oscillating portion 310, thereby creating a state equivalent to increasing or decreasing the average torsion spring constant k of the link portion 330 during the oscillation of the oscillating portion 310.

Figure 22:
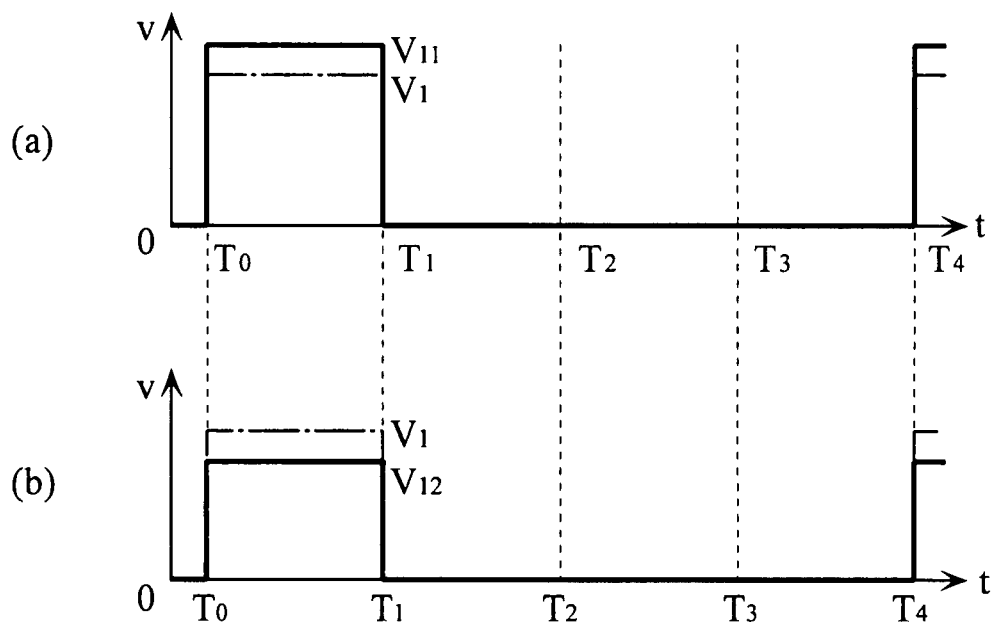
FIG. 22(a)-(b) is a diagram showing a voltage application mode to a comb electrode.

For example, changing the voltage $V_1$ applied to the comb electrode 370 between the time $T_0$ and the time $T_1$ under the normal drive to a voltage $V_{11}$ ($>V_1$) as shown in FIG. 22(a) results in an increase in rotational torque applied to the oscillating portion 310 between the time $T_0$ and the time $T_1$, in comparison with the torque under the normal drive. Such increase in rotational torque creates a state equivalent to decreasing the torsion spring constant of the link portion 330, between the time $T_0$ and the time $T_1$ (i.e. while the oscillation angle of the oscillating portion 310 increases from 0° to $\theta_1$).

Changing the voltage $V_1$ applied to the comb electrode 370 under the normal drive between the time $T_0$ and the time $T_1$ to a voltage $V_{12}$ ($<V_1$) as shown in FIG. 22(b) results in a decrease in rotational torque applied to the oscillating portion 310 between the time $T_0$ and the time $T_1$, in comparison with the torque under the normal drive. Such decrease in rotational torque creates a state equivalent to increasing the torsion spring constant of the link portion 330, between the time $T_0$ and the time $T_1$ (i.e. while the oscillation angle of the oscillating portion 310 increases from 0° to $\theta_1$).

Figure 23:
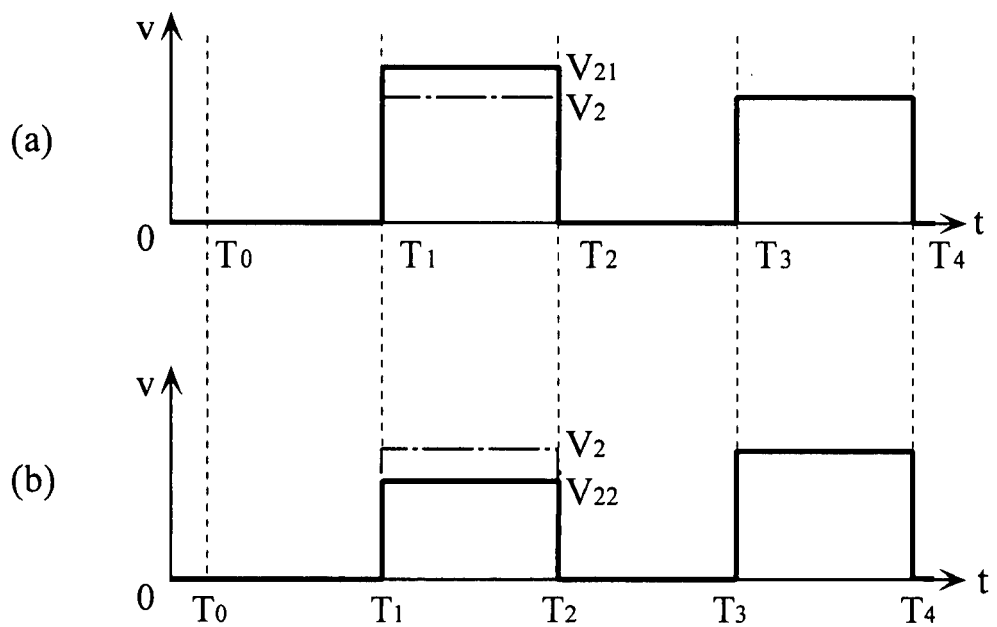
FIG. 23(a)-(b) is a diagram showing another voltage application mode to the comb electrode.

Changing the voltage $V_2$ applied to the comb electrodes 360, 380 under the normal drive between the time $T_1$ and the time $T_2$ to a voltage $V_{21}$ ($>V_2$) as shown in FIG. 23(a) results in an increase in rotational torque applied to the oscillating portion 310 between the time $T_1$ and the time $T_2$, in comparison with the torque under the normal drive. Such increase in rotational torque creates a state equivalent to increasing the torsion spring constant of the link portion 330, between the time $T_1$ and the time $T_2$ (i.e. while the oscillation angle of the oscillating portion 310 decreases from $\theta_1$ to 0°).

Changing the voltage $V_2$ applied to the comb electrodes 360, 380 under the normal drive between the time $T_1$ and the time $T_2$ to a voltage $V_{22}$ ($<V_2$) as shown in FIG. 23(b) results in a decrease in rotational torque applied to the oscillating portion 310 between the time $T_1$ and the time $T_2$, in comparison with the torque under the normal drive. Such decrease in rotational torque creates a state equivalent to decreasing the torsion spring constant of the link portion 330, between the time $T_1$ and the time $T_2$ (i.e. while the oscillation angle of the oscillating portion 310 decreases from $\theta_1$ to 0°).

Figure 24:
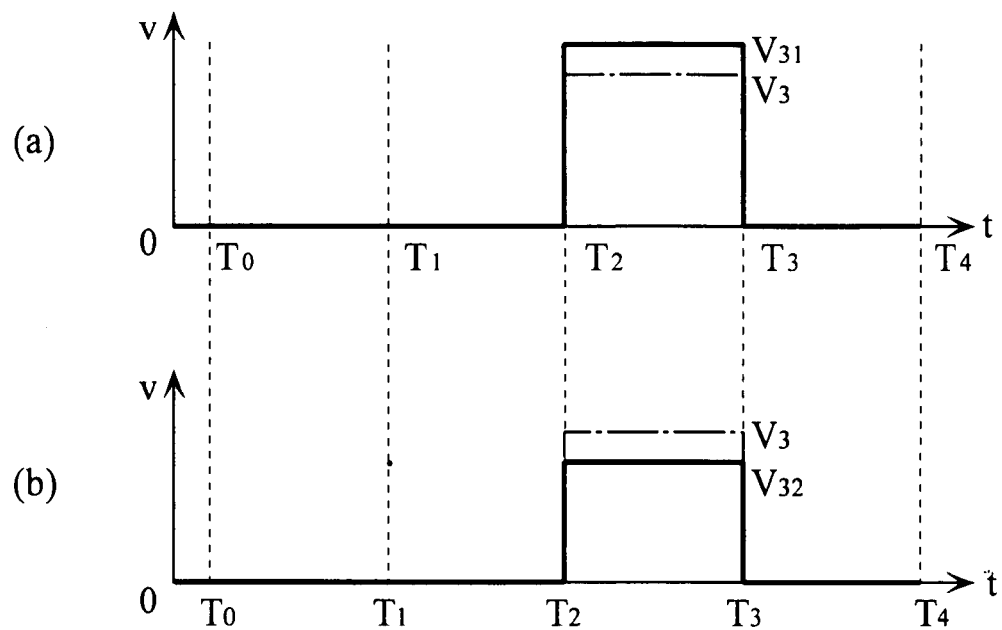
FIG. 24(a)-(b) is a diagram showing another voltage application mode to the comb electrode.

Changing the voltage $V_3$ applied to the comb electrode 390 under the normal drive between the time $T_2$ and the time $T_3$ to a voltage $V_{31}$ ($>V_3$) as shown in FIG. 24(a) results in an increase in rotational torque applied to the oscillating portion 310 between the time $T_2$ and the time $T_3$, in comparison with the torque under the normal drive. Such increase in rotational torque creates a state equivalent to decreasing the torsion spring constant of the link portion 330, between the time $T_2$ and the time $T_3$ (i.e. while the oscillation angle of the oscillating portion 310 increases from 0° to $\theta_2$).

Changing the voltage $V_3$ applied to the comb electrode 390 under the normal drive between the time $T_2$ and the time $T_3$ to a voltage $V_{32}$ ($<V_3$) as shown in FIG. 24(b) results in a decrease in rotational torque applied to the oscillating portion 310 between the time $T_2$ and the time $T_3$, in comparison with the torque under the normal drive. Such decrease in rotational torque creates a state equivalent to increasing the torsion spring constant of the link portion 330, between the time $T_2$ and the time $T_3$ (i.e. while the oscillation angle of the oscillating portion 310 increases from 0° to $\theta_2$).

Figure 25:
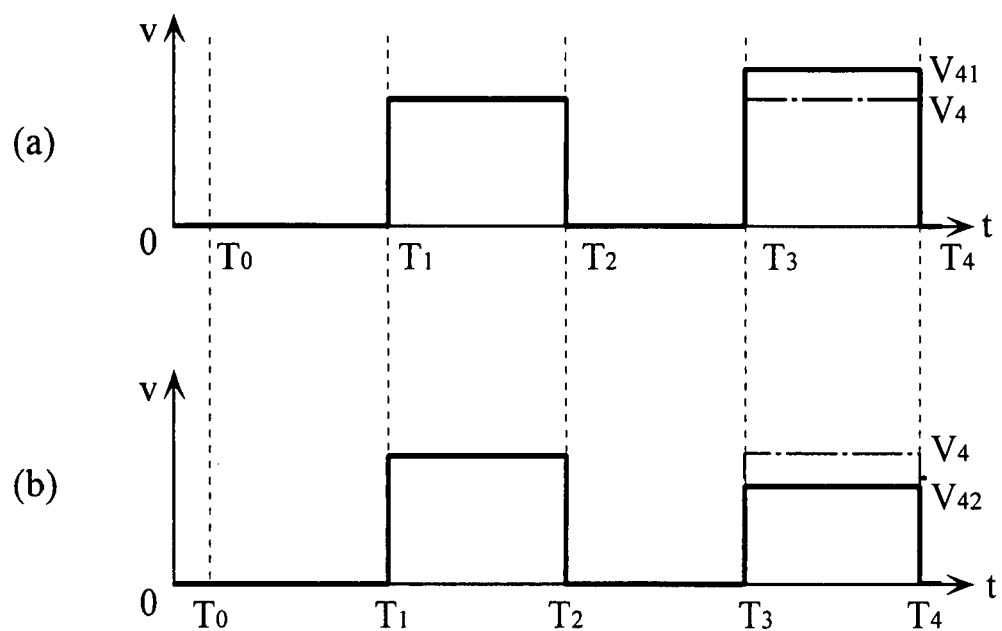
FIG. 25(a)-(b) is a diagram showing another voltage application mode to the comb electrode.
Figure 26:
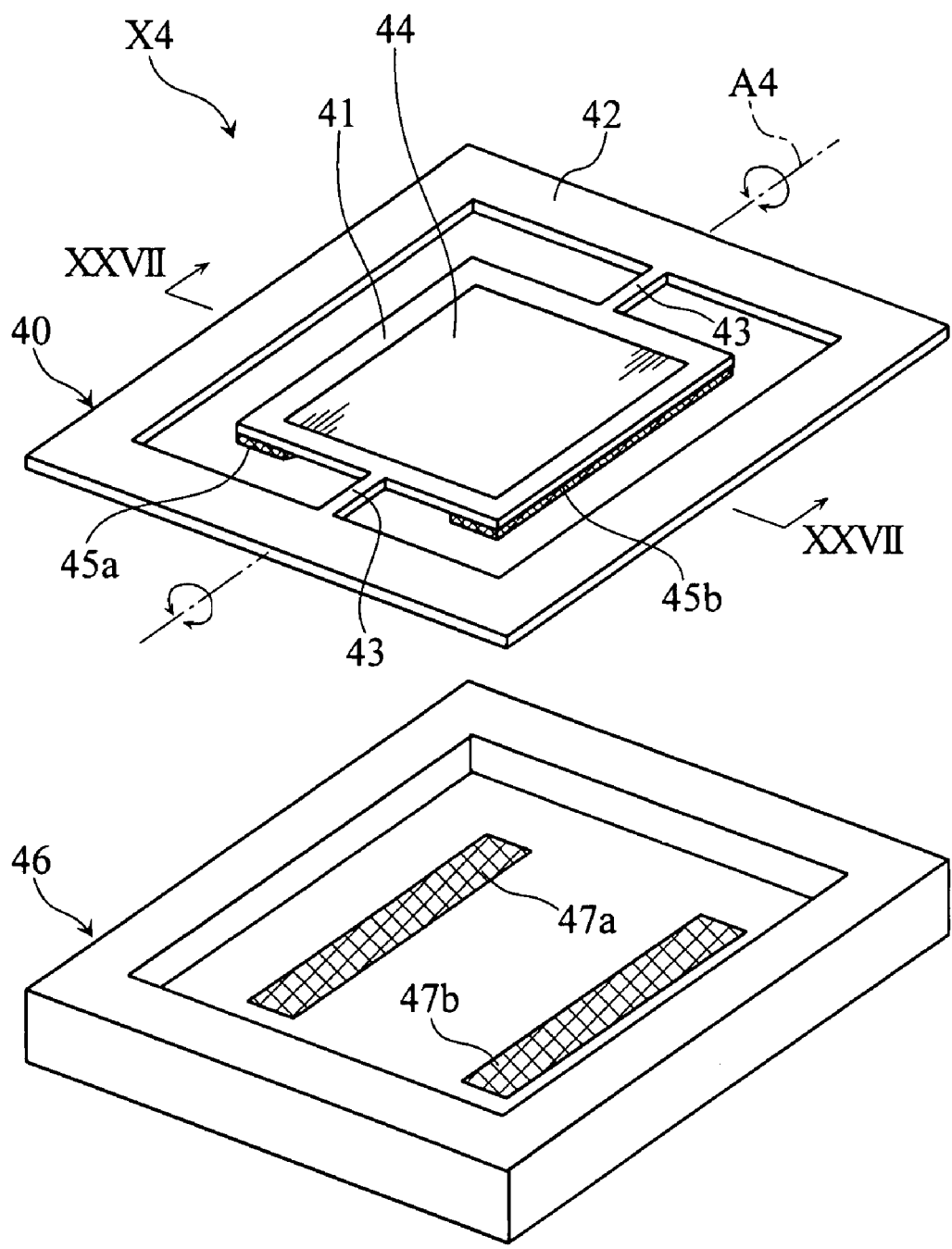
FIG. 26 is an exploded perspective view showing a conventional micromirror element.
Figure 27:
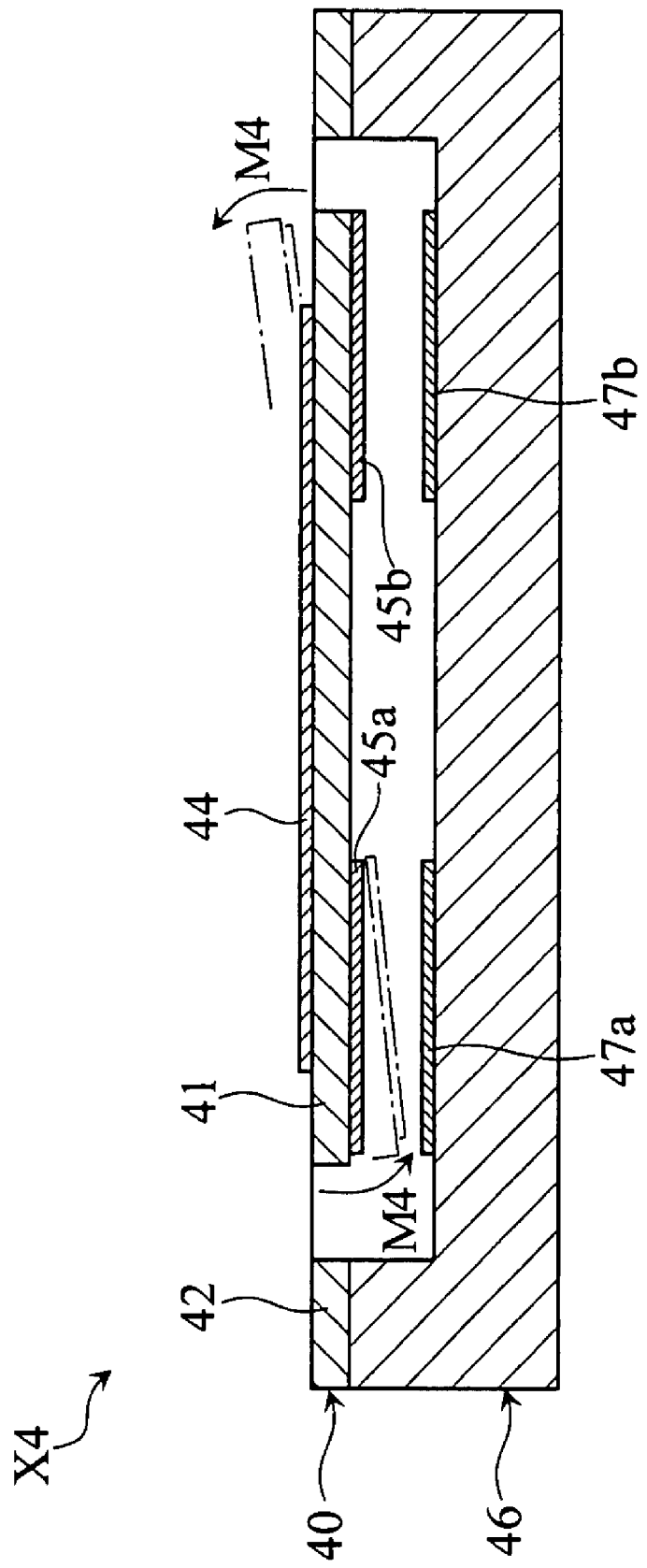
FIG. 27 is a cross-sectional view taken along a line XXVII-XXVII in FIG. 26, based on the assembled state of the micromirror element.

Changing the voltage $V_4$ applied to the comb electrodes 360, 380 under the normal drive between the time $T_3$ and the time $T_4$ to a voltage $V_{41}$ (>$V_4$) as shown in FIG. 25(a) results in an increase in rotational torque applied to the oscillating portion 310 between the time $T_3$ and the time $T_4$, in comparison with the torque under the normal drive. Such increase in rotational torque creates a state equivalent to increasing the torsion spring constant of the link portion 330, between the time $T_3$ and the time $T_4$ (i.e. while the oscillation angle of the oscillating portion 310 decreases from $\theta_2$ to 0°).

Changing the voltage $V_4$ applied to the comb electrodes 360, 380 under the normal drive between the time $T_3$ and the time $T_4$ to a voltage $V_{42}$ (<$V_4$) as shown in FIG. 25(b) results in an decrease in rotational torque applied to the oscillating portion 310 between the time $T_3$ and the time $T_4$, in comparison with the torque under the normal drive. Such decrease in rotational torque creates a state equivalent to decreasing the torsion spring constant of the link portion 330, between the time $T_3$ and the time $T_4$ (i.e. while the oscillation angle of the oscillating portion 310 decreases from $\theta_2$ to 0°).

In the micromirror element X3, adopting a drive mode variation (change from the normal drive mode), for example out of those cited above, or properly combining two or more thereof, allows creating a state equivalent to increasing or decreasing the torsion spring constant of the link portion 330 in a part of the oscillation angle range of the oscillating motion of the oscillating portion 310, thereby creating a state equivalent to increasing or decreasing the average torsion spring constant k of the link portion 330 during the oscillation of the oscillating portion 310.

As is understood from the equation (1), the smaller the torsion spring constant k of the link portion 330 is, the lower the natural frequency (resonance frequency) f relevant to the oscillating motion of the oscillating portion 310 becomes, and the greater the torsion spring constant k is, the higher the natural frequency f becomes. In the micromirror element X3, therefore, adopting one of the drive mode variations, for example as those cited above, or properly combining two or more thereof, allows electrically controlling the torsion spring constant k of the link portion 310, thereby adjusting the natural frequency f relevant to the oscillating motion of the oscillating portion 310. Such adjusting method of the natural frequency allows analogically adjusting the natural frequency f relevant to the oscillating motion of the oscillating portion in finer increments, and hence with higher accuracy, than the conventional natural frequency adjustment by the mechanical process.

The micromirror element X3 also eliminates the need of performing the mechanical process on the oscillating portion 310 for adjusting the natural frequency f, after once completing the formation of the chip. Moreover, the micromirror element X3 equally permits increasing and decreasing the torsion spring constant k of the link portion 330, thereby providing a higher degree of freedom in adjusting the natural frequency f.

The foregoing micromirror elements X1, X2, X3 include in common the oscillating portion, the frame, and the link portion connecting the oscillating portion and the frame, and defining the oscillation axial center of the oscillating motion of the oscillating portion with respect to the frame. The micromirror element X1 includes a configuration that changes the inertia of the oscillating portion of the micro-oscillation element (first configuration). The micromirror element X2 includes a configuration that changes the torsion spring constant of the link portion of the micro-oscillation element through deformation of the link portion (second configuration). The micromirror element X3 includes a configuration that electrically creates a state equivalent to changing the torsion spring constant of the link portion of the micro-oscillation element (third configuration). The present invention may include the combination of the first and the second configuration, the second and the third configuration, the third the first configuration, and all of the first to the third configurations.

The invention claimed is:

1. A micro-oscillation element comprising:
   an oscillating portion including at least one flat surface;
   a frame; and
   a link portion that connects the oscillating portion and the frame to each other, and that defines an oscillation axial center of an oscillating motion of the oscillating portion with respect to the frame;
   wherein the oscillating portion includes a main oscillating body and a weight portion attached to the main oscillating body via supporting beams flanking the weight portion, the weight portion being movable in a direction intersecting the oscillation axial center and parallel to the flat surface, the weight portion being disposed to face the flat surface in a manner such that the weight portion is spaced apart from the flat surface.

2. The micro-oscillation element according to claim 1, wherein the oscillating portion includes supporting bases fixed to the main oscillating body, and the supporting beams connect the weight portion to the supporting bases, respectively.

3. The micro-oscillation element according to claim 1, wherein the oscillating portion includes a first comb electrode fixed to the main oscillating body, the weight portion including a second comb electrode that generates a static attractive force in cooperation with the first comb electrode.

4. The micro-oscillation element according to claim 1, further comprising a first drive mechanism and a second drive mechanism, wherein the first drive mechanism is capable of both generating a first rotational torque for the oscillating portion in a first oscillation direction and controlling at least one of magnitude and generating time of the first rotational torque, the second drive mechanism being capable of both generating a second rotational torque for the oscillating portion in a second oscillation direction opposite to the first oscillation direction and controlling at least one of magnitude and generating time of the second rotational torque.

5. The micro-oscillation element according to claim 4, wherein the first and the second drive mechanisms include a first comb electrode, a second comb electrode that generates a static attractive force in cooperation with the first comb electrode, and a third comb electrode that generates a static attractive force in cooperation with the first comb electrode, wherein the first comb electrode is fixed to the oscillating portion, the second comb electrode being fixed to the frame at a position where the second comb electrode does not face the first comb electrode when not driven, the third comb electrode being fixed to the frame at a position where the third comb electrode faces the first comb electrode when not driven, the second and the third comb electrodes are parallelly disposed.

* * * * *